US008571897B2

(12) United States Patent
Reynolds et al.

(10) Patent No.: US 8,571,897 B2
(45) Date of Patent: *Oct. 29, 2013

(54) SYSTEM AND METHOD FOR ADMINISTERING INSURANCE POLICIES ISSUED BEFORE COMPREHENSIVE UNDERWRITING

(75) Inventors: Leslie Ann Reynolds, Simsbury, CT (US); Michael J. Roscoe, South Windsor, CT (US); Greg D. Lindquist, Champlin, MN (US); Kimberly Ann Rasmussen, Mound, MN (US); Steven J. Williams, Plymouth, MN (US)

(73) Assignee: The Prudential Insurance Company of America, Newark, NJ (US)

( * ) Notice: Subject to any disclaimer, the term of this patent is extended or adjusted under 35 U.S.C. 154(b) by 119 days.

This patent is subject to a terminal disclaimer.

(21) Appl. No.: 12/958,801

(22) Filed: Dec. 2, 2010

(65) Prior Publication Data
US 2011/0125536 A1 May 26, 2011

Related U.S. Application Data

(63) Continuation-in-part of application No. 12/624,044, filed on Nov. 23, 2009, now Pat. No. 8,224,677.

(51) Int. Cl.
*G06Q 40/00* (2012.01)
(52) U.S. Cl.
USPC .......................................................... 705/4
(58) Field of Classification Search
USPC .......................................................... 705/4
See application file for complete search history.

(56) References Cited

U.S. PATENT DOCUMENTS

| 7,395,219 | B2  | 7/2008  | Strech          |       |
|-----------|-----|---------|-----------------|-------|
| 7,580,872 | B2  | 8/2009  | Van Slyke et al.|       |
| 8,224,677 | B2  | 7/2012  | Reynolds et al. |       |
| 2002/0002475 | A1 | 1/2002 | Freedman et al. |       |
| 2002/0029158 | A1 | 3/2002 | Wolff et al.    |       |
| 2002/0087364 | A1 | 7/2002 | Lerner et al.   |       |
| 2002/0120474 | A1* | 8/2002 | Hele et al. .................... | 705/4 |
| 2002/0147618 | A1 | 10/2002 | Mezrah et al.   |       |
| 2003/0074231 | A1 | 4/2003 | Renes et al.    |       |
| 2003/0083908 | A1 | 5/2003 | Steimann        |       |
| 2004/0148201 | A1 | 7/2004 | Smith et al.    |       |
| 2007/0244726 | A1 | 10/2007 | Jenkins         |       |

(Continued)

OTHER PUBLICATIONS

Rapid Decision Term, Fidelity Life Association, www.fidelitylifeassociation.com/life/rdterm.asp (2009).

(Continued)

*Primary Examiner* — James A Vezeris
(74) *Attorney, Agent, or Firm* — Baker Botts L.L.P.

(57) ABSTRACT

A computer system for administering applications for life insurance has a processor and a memory storage device in communication with the processor. The processor is configured to receive data indicative of an application and an initial premium payment from a proposed insured for life insurance; based on the received data, determine whether the proposed insured is eligible for life insurance issued before completion of comprehensive underwriting; responsive to a determination that the proposed insured is eligible, generate an output signal having data indicative of a decision to respond to the application by issuing a policy and by commencing a comprehensive underwriting process. The processor may be configured to receive data indicative of a result of the comprehensive underwriting process and based on the result of the comprehensive underwriting process, provide an output signal indicative of policy changes.

25 Claims, 18 Drawing Sheets

(56) References Cited

U.S. PATENT DOCUMENTS

| | | | |
|---|---|---|---|
| 2008/0040163 A1 | 2/2008 | Harlin et al. | |
| 2008/0069408 A1 | 3/2008 | Cervantes | |
| 2008/0126138 A1 | 5/2008 | Cherney et al. | |
| 2009/0182583 A1 | 7/2009 | Harkensee et al. | |
| 2009/0182584 A1* | 7/2009 | Harkensee et al. | 705/4 |
| 2009/0182585 A1 | 7/2009 | Harkensee et al. | |
| 2011/0040582 A1 | 2/2011 | Mullins | |
| 2011/0125537 A1 | 5/2011 | Reynolds et al. | |
| 2011/0125651 A1 | 5/2011 | Reynolds et al. | |
| 2012/0271661 A1 | 10/2012 | Reynolds et al. | |
| 2013/0035964 A1 | 2/2013 | Roscoe et al. | |

OTHER PUBLICATIONS

Rapid Decision Mortgage Term, Fidelity Life Association, www.fidelitylifeassociation.com/life/rdMortgage.asp (2009).

Reynolds et al., U.S. Appl. No. 12/959,116, Notice of Allowance from US PTO, Apr. 4, 2013.
Reynolds et al., U.S. Appl. No. 13/535,173, After Final Office Action from US PTO, Apr. 16, 2013.
Reynolds et al., U.S. Appl. No. 12/959,116, Non-final Office Action from US PTO, Nov. 2, 2012.
Reynolds et al., U.S. Appl. No. 12/959,116, Response to Non-final Office Action from US PTO, Jan. 29, 2013.
Reynolds et al., U.S. Appl. No. 12/624,044, Non-final Office Action from US PTO, Nov. 22, 2011.
Reynolds et al., U.S. Appl. No. 12/624,044, Response to Non-final Office Action from US PTO, Feb. 22, 2012.
Reynolds et al., U.S. Appl. No. 12/624,044, Notice of Allowance Office Action from US PTO, Apr. 10, 2012.
Reynolds et al., U.S. Appl. No. 13/535,173, Non-final Office Action from US PTO, Dec. 5, 2012.
Reynolds et al., U.S. Appl. No. 13/535,173, Response to Non-final Office Action from US PTO, Feb. 27, 2013.

* cited by examiner

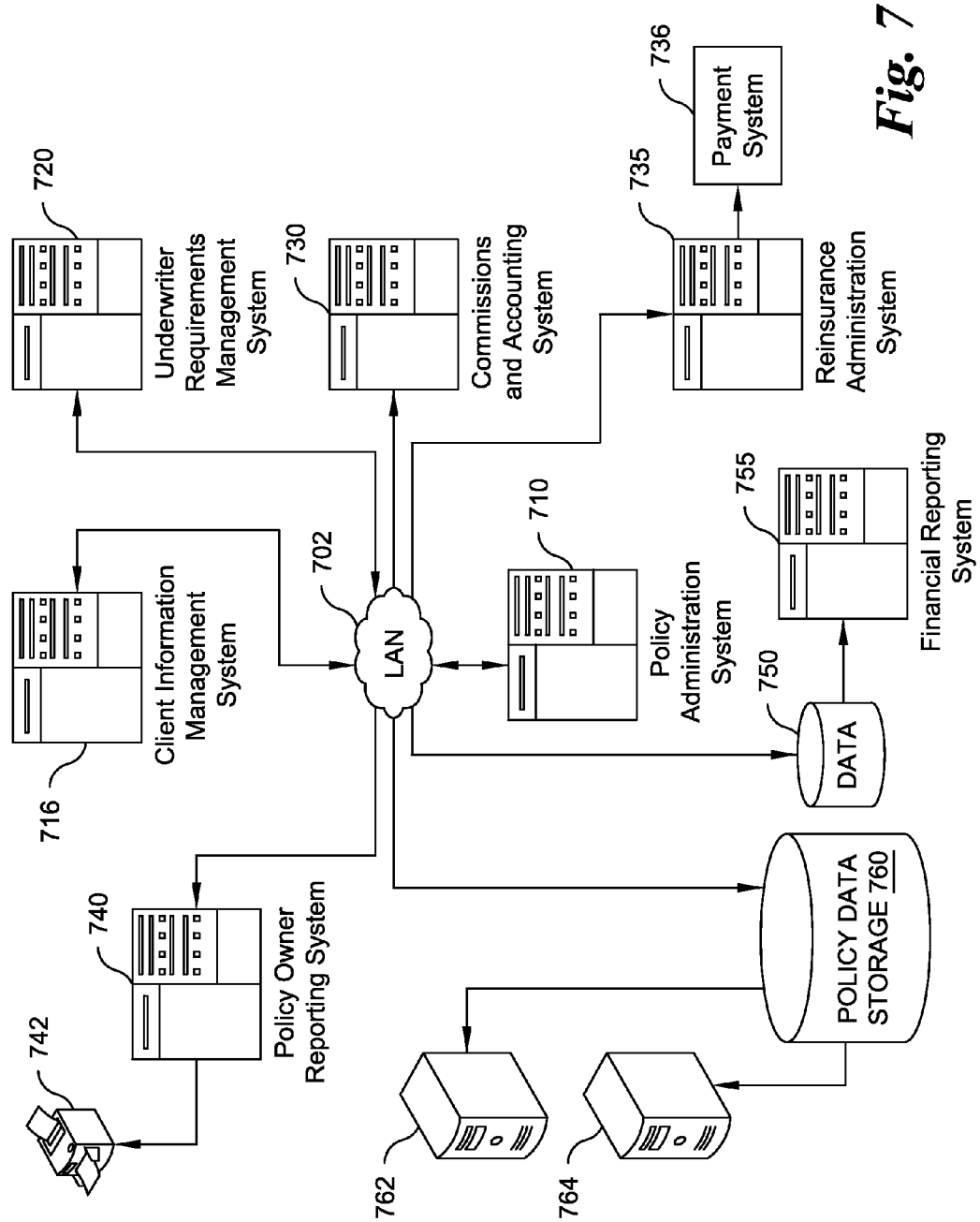

Fig. 8A

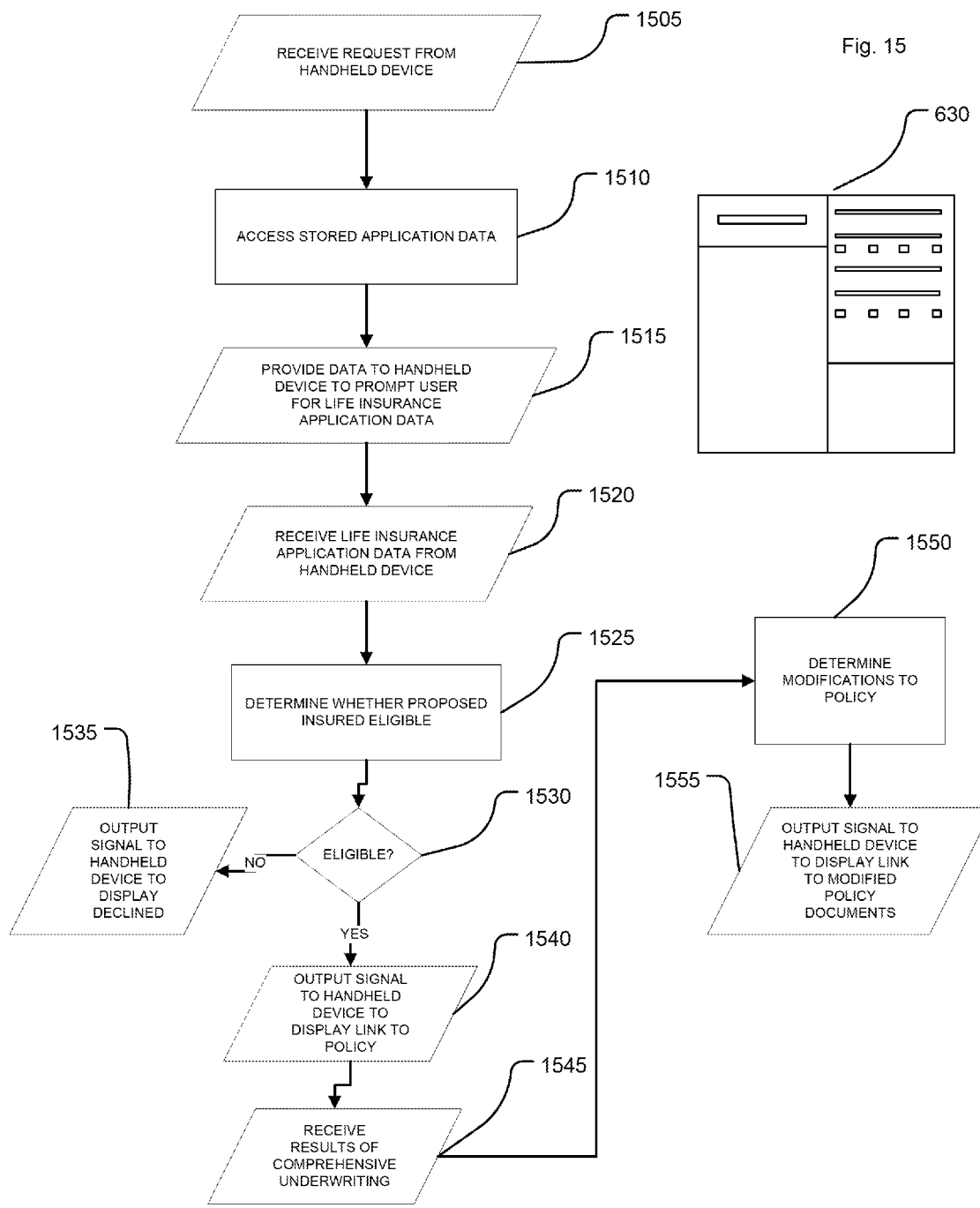

SYSTEM AND METHOD FOR ADMINISTERING INSURANCE POLICIES ISSUED BEFORE COMPREHENSIVE UNDERWRITING

CROSS-REFERENCE TO RELATED APPLICATIONS

This application is a continuation-in-part of copending U.S. patent application Ser. No. 12/624,044 entitled SYSTEM AND METHOD FOR ADMINISTERING LIFE INSURANCE POLICIES ISSUED PRIOR TO UNDERWRITING filed Nov. 23, 2009, the entire contents of which is herein incorporated by reference for all purposes.

FIELD OF INVENTION

The present invention relates to computer systems, and particularly to computer systems for administering financial products such as life insurance policies.

BACKGROUND

In the process of application for and issue of life insurance policies, a prospective insured typically meets with a broker or other representative. The prospective insured, working with the broker, completes a detailed form furnished by an insurance company with information pertinent to underwriting the risk associated with insuring the proposed insured. The broker submits the completed form to the insurance company. Upon receipt of the form, the insurance company performs a comprehensive underwriting process. The comprehensive underwriting process includes use of the information on the form in rating the prospective insured, and may also include obtaining information from at least one treating physician, arranging for a medical technician or other medical professional to meet with the proposed insured and draw blood and obtain other data, such as height and weight data. At the completion of the comprehensive underwriting process, the insurance company advises the broker whether the proposed insured will be insured. If the proposed insured will be insured, the insurance company advises the broker of the rating and the amount of coverage approved. Depending on the type of policy, the insurance company may provide the premium for the amount of coverage. For certain types of policies, such as flexible premium adjustable life policies and universal life policies, a rating and a schedule of charges are provided.

The process of comprehensive underwriting, as generally described above, requires a long period, such as about 35 days. From the perspective of the prospective insured, this may be an undesirably long time period. For example, the prospective insured may wish to have life insurance coverage within a shorter period of time. The prospective insured is uncomfortable with an unresolved status for this long period of time. During this long period of time, the prospective insured may reconsider whether to obtain coverage, or to change the type of coverage or the insurer. Once the comprehensive underwriting process is complete, the prospective insured may not be interested in the policy. From the insurance company's perspective, the time period is thus disadvantageous.

One approach to addressing the length of time associated with comprehensive underwriting is a temporary insurance policy. A temporary life insurance policy provides coverage for a limited period of time, such as a period of 90 days, while an insurance company performs comprehensive underwriting to determine insurability and a rating for a longer term. The temporary life insurance policy may be issued based on responses to a limited set of questions designed to eliminate those with serious medical conditions or otherwise at an elevated risk of dying within the limited term of the temporary insurance policy. The temporary life insurance policy may terminate on issue of a comprehensively underwritten policy, with the premiums paid on the temporary life insurance policy being credited, in whole or in part, against the premiums on the comprehensively underwritten life insurance policy.

Another approach to addressing the length of time associated with comprehensive underwriting is conditional receipt coverage. When an applicant submits an application for life insurance, with a premium payment, the receipt for the payment provides life insurance for a short period of time. The coverage continues until the insurance company completes comprehensive underwriting and either declines to provide coverage or issues a policy.

Further approaches to addressing the undesirable aspects of the length of time associated with comprehensive underwriting of a proposed insured are disclosed in U.S. Patent Publication No. 2009/0182583 (Harkensee '583), U.S. Patent Publication No. 2009/0182584 (Harkensee '584), and U.S. Patent Publication No. 2009/0182585 (Harkensee '585). In Harkensee '583, an insurer sells a life insurance policy with two distinct coverage periods. Prior to making the policy available, the insurer underwrites the insurance contract on a limited basis using information obtainable by performing database queries, such as information about the prescription drugs an individual takes or has taken, the proposed insured's driving and criminal record, and medical and non-medical information. If the limited underwriting qualifies the prospective insured for coverage, the premium amounts may be higher than the premiums would be for a traditional policy offered with temporary conditional receipt coverage with an identical benefit amount. During the first coverage period, the insured may submit additional information, test results and/or other material. Comprehensive medical underwriting may be performed. If the insured is qualified, the insurance contract is amended modified or replaced in order to provide for an extended coverage period. If the insured is not qualified, the insurance contract may expire after the first coverage period, or may be modified so as to provide reduced coverage for the extended coverage period.

In Harkensee '584, a life insurance policy has a single coverage period. The initial premiums paid by the insured are relatively high compared to premiums paid for standard conditional receipt coverage or comprehensively underwritten policies, but are generally lower than typical premiums for standard simplified issue policies. The insurer accepts the application after completing underwriting on a limited basis, preferably using information available in databases. The insured has the option of submitted additional information, such as medical test results. An underwriter then comprehensively underwrites the insured. If the results of the underwriting are satisfactory, the premiums owed by the insured are reduced significantly for the remainder of the term of the policy or the benefit amount is increased.

In Harkensee '585, a prospective insured makes an offer for life insurance. The insurance company searches databases to underwrite the insurance policy on a limited basis. If the limited underwriting qualifies the individual, the insurance company provides blended coverage including an all-cause coverage portion and an accidental death only coverage portion. The total benefit amount may be the insured's desired coverage amount. During an initial policy period, the blended coverage includes a relatively smaller all-cause portion and a relatively higher accidental death only portion. The policy may permit the insured to submit information to enable comprehensive medical underwriting. Based on a risk classification as indicated by the comprehensive medical underwriting, the insurance company may modify the blended coverage to provide an increased all-cause benefit amount.

All of the above approaches have disadvantages. Temporary insurance terminates within a short period of time, such as 90 days, and thus provides the insured no assurance of continued coverage. Conditional receipt coverage also terminates relatively quickly, such as upon completion of comprehensive underwriting, which may be within about 35 days, and thus does not meet the need for long term life insurance coverage. In Harkensee '583, the coverage may terminate at the end of a first coverage period. In Harkensee '584, there are two levels of premium; a higher, first level may be reduced upon comprehensive underwriting. In Harkensee '585, the policy does not provide an all cause or all risk policy for the same cost of coverage as a comprehensively underwritten policy.

SUMMARY

In one embodiment, a computer system for administering applications for life insurance includes a processor and a memory storage device in communication with the processor. The processor is configured to: receive data indicative of an application by a proposed insured for life insurance, the data including application data and data, furnished by the proposed insured, relating to the health of the proposed insured, and an initial premium payment; based exclusively on the received data, determine whether the proposed insured is eligible for life insurance to issue before completion of comprehensive underwriting; responsive to a determination that the proposed insured is not eligible, generate an output signal having data indicative of a decision to respond to the application by declining to provide insurance; responsive to a determination that the proposed insured is eligible, generate an output signal having data indicative of a decision to respond to the application by issuing a policy. The processor may be configured to provide data relating to the policy, issued prior to comprehensive underwriting, to an insurance process computer system, such as a document generation and printing system, a reinsurance administration system and a commissions and accounting system. The insurance process computer system may be configured to perform insurance processes, such as printing policy documents, calculating risk amount to be ceded and reinsurance premiums, and calculating commissions, based on the data relating to the policy issued prior to comprehensive underwriting. The processor may be further configured to initiate a comprehensive underwriting process; receive data indicative of a result of the comprehensive underwriting process; based on the result of the comprehensive underwriting process, determine whether the policy is changed, and provide an output signal indicative of whether the policy is changed. The processor may be configured to provide data relating to the policy to the insurance process computer system, which may be configured to perform the insurance processes based on the policy after comprehensive underwriting.

In an embodiment, a computer-implemented method for administering applications for insurance includes receiving by a processor of a computer system data associated with an application by a proposed insured for a life insurance policy. The data includes data furnished by the proposed insured relating to the health of the proposed insured. The data also includes data relating to the policy applied for, including data indicative of proposed insured information, requested death benefit amount, type of policy, identification of beneficiary, and premium paid. The method further includes storing by the processor in a memory storage device of the computer system the received health data and policy data; accessing by the processor from the memory storage device data indicative of criteria for eligibility for issue of a life insurance policy prior to comprehensive underwriting; determining by the processor, based on the received health data and the accessed data indicative of criteria for eligibility, whether the proposed insured is eligible for issue of a life insurance policy prior to comprehensive underwriting; and responsive to a determination that the proposed insured is eligible, generating by the processor an output signal having data indicative of instructions to generate and deliver to the proposed insured a life insurance policy on the life of the proposed insured.

In an embodiment, a non-transitory computer readable medium has processor-executable instructions stored thereon. The instructions, when executed by a processor, cause the processor to: receive data indicative of an application by a proposed insured for life insurance, the data including data furnished by the proposed insured relating to health of the proposed insured, and requested policy data, including data indicative of proposed insured information, requested death benefit amount, type of policy, identification of beneficiary, and initial premium paid. The instructions further cause the processor to: store in a memory storage device in communication with the processor the received health data and policy data; access from the memory storage device stored data indicative of criteria for eligibility for issue of a life insurance policy prior to comprehensive underwriting; determine based on the received data relating to the health of the proposed insured and the accessed data indicative of criteria for eligibility, whether the proposed insured is eligible for life insurance; and responsive to a determination that the proposed insured is eligible, generate an output signal having data indicative of instructions to issue a life insurance policy on the life of the proposed insured, and an output signal having data indicative of instructions to commence comprehensive underwriting of the proposed insured.

In an embodiment, a computer system for administering applications for insurance includes a processor and a memory storage device having stored data indicative of criteria for eligibility for issue of a life insurance policy prior to comprehensive underwriting, in communication with the processor. The processor is configured to: receive data indicative of an application by a proposed insured for life insurance for issue prior to comprehensive underwriting; determine, based on the received data, whether the proposed insured is eligible for life insurance for issue prior to comprehensive underwriting; responsive to a determination that the proposed insured is eligible, generate an output signal having data indicative of instructions to issue a life insurance policy on the life of the proposed insured, and an output signal having data indicative of instructions to commence comprehensive underwriting of the proposed insured; provide to an insurance process administration computer system data relating to the issued initial policy for determining insurance data associated with the issued initial policy; receive data indicative of a result of the comprehensive underwriting process; based on the result of the comprehensive underwriting process, determine terms of a final issued policy; and provide to the insurance process administration computer system data relating to the final issued policy.

In an embodiment, a computer-implemented method for administration of insurance, includes: receiving by a processor, and storing by the processor in a memory device in communication with the processor, data indicative of an application and an initial premium payment from a proposed insured for life insurance for issue prior to comprehensive underwriting. The method further includes: based on the received data, determining by the processor whether the proposed insured is eligible for life insurance issued prior to comprehensive underwriting; responsive to a determination that the proposed insured is eligible, generating by the processor an output signal having data indicative of a decision to respond to the application by issuing an initial policy and commencing a comprehensive underwriting process, and providing to an insurance process administration computer system data relating to the issued initial policy for determining insurance data associated with the issued initial policy; receiving by the processor data indicative of a result of the comprehensive underwriting process; based on the result of the comprehensive underwriting process, determining by the processor terms of a final issued policy; and providing to the insurance process administration computer system data relating to the final issued policy.

In an embodiment, a non-transitory computer-readable medium has computer-readable instructions thereon which, when executed by a processor, cause the processor to: receive data indicative of an application and an initial premium payment from a proposed insured for life insurance issued before comprehensive underwriting; based on the received data, determine whether the proposed insured is eligible for life insurance issued before comprehensive underwriting; responsive to a determination that the proposed insured is eligible, generate an output signal having data indicative of a decision to respond to the application by issuing an initial policy and commencing a comprehensive underwriting process; provide to an insurance process administration computer system data relating to the issued initial policy for determining insurance data associated with the issued initial policy; receive data indicative of a result of the comprehensive underwriting process; based on the received data indicative of the result of the comprehensive underwriting process, determine terms of a final issued policy; and responsive to the determined rating category, provide to the insurance process administration computer system data relating to the final issued policy.

In an embodiment, a computer system for generating life insurance policy documents includes a data storage device for storing life insurance policy document templates and first flags associated with the life insurance policy document templates, indicative of first documents for generation upon issuing of a life insurance policy issued prior to completion of comprehensive underwriting, and second flags associated with the life insurance policy document templates indicative of second documents for generation upon completion of comprehensive underwriting of the life insurance policy; a processor in communication with the storage device and configured to, responsive to receipt of data indicative of issuing of a life insurance policy issued prior to completion of comprehensive underwriting, access from the storage device first templates having first flags associated therewith, generate first documents using the accessed first templates and the received data indicative of issuing of the life insurance policy, and provide an output signal indicative of the generated first documents; and responsive to receipt of data indicative of completion of comprehensive underwriting of the life insurance policy, access from the storage device second templates having second flags associated therewith, generate second documents using the accessed second templates and the received data indicative of completion of comprehensive underwriting, and provide an output signal indicative of the generated second documents.

In an embodiment, a computer-implemented method for generating life insurance policy documents includes receiving by a processor data indicative of issuing of a life insurance policy issued prior to completion of comprehensive underwriting; responsive to the receipt of the data indicative of issuing of a life insurance policy issued prior to completion of comprehensive underwriting, accessing by the processor from a data storage device in communication with the processor first life insurance policy document templates having associated first flags indicative of first documents for generation upon issuing of a life insurance policy issued prior to completion of comprehensive underwriting; generating by the processor first documents using the accessed first templates and the received data indicative of issuing of the life insurance policy, providing by the processor an output signal indicative of the generated first documents; receiving by the processor data indicative of completion of comprehensive underwriting of the life insurance policy; responsive to the receipt of the data indicative of completion of comprehensive underwriting of the life insurance policy, accessing by the processor from the data storage device second templates having second flags associated therewith; and generating second documents using the accessed second templates and the received data indicative of completion of comprehensive underwriting.

In an embodiment, a computer system for determining reinsurance data for life insurance policies includes a data storage device for storing rules relating to ceding portions of risk on life insurance policies; and a processor in communication with the data storage device and configured to, responsive to receipt of data indicative of issuing of a life insurance policy issued prior to completion of comprehensive underwriting, access from the data storage device the rules relating to ceding portions of risk on life insurance policies, determine a first amount of risk ceded and a first reinsurance premium amount based on the received data indicative of issuing of a life insurance policy issued prior to completion of comprehensive underwriting and the rules, and provide an output signal indicative of the first amount of risk ceded and the first reinsurance premium amount; and responsive to receipt of data indicative of completion of comprehensive underwriting of the life insurance policy, access from the storage device the rules relating to ceding portions of risk on life insurance policies and determine a second amount of risk ceded and a second reinsurance premium amount based on the received data indicative of completion of comprehensive underwriting of the life insurance policy and the rules, and provide an output signal indicative of the second amount of risk ceded and the second reinsurance premium amount.

In an embodiment, a computer-implemented method for determining reinsurance data for life insurance policies includes receiving by a processor data indicative of issuing of a life insurance policy issued prior to completion of comprehensive underwriting; responsive to the receipt of the data, accessing by the processor from a data storage device in communication with the processor rules relating to ceding portions of risk on life insurance policies; determining by the processor a first amount of risk ceded and a first reinsurance premium amount based on the received data indicative of issuing of a life insurance policy issued prior to completion of comprehensive underwriting and the rules; providing by the processor an output signal indicative of the first amount of risk ceded and the first reinsurance premium amount; receiving by the processor data indicative of completion of comprehensive underwriting of the life insurance policy; responsive to the receipt of the data indicative of completion of comprehensive underwriting of the life insurance policy, accessing by the processor from the data storage device the rules relating to ceding portions of risk on life insurance policies; determining by the processor a second amount of risk ceded and a second reinsurance premium amount based on the received data indicative of completion of comprehensive underwriting of the life insurance policy and the rules; and providing an output signal indicative of the second amount of risk ceded and the second reinsurance premium amount.

In an embodiment, a non-transitory computer-readable medium, has computer-readable instructions thereon which, when executed by a processor, cause the processor to: responsive to receipt of data indicative of issuing of a life insurance policy issued prior to completion of comprehensive underwriting, access from a data storage device in communication with the processor rules relating to ceding portions of risk on life insurance policies; determine a first amount of risk ceded and a first reinsurance premium amount based on the received data indicative of issuing of a life insurance policy issued prior to completion of comprehensive underwriting and the rules; provide an output signal indicative of the first amount of risk ceded and the first reinsurance premium amount; responsive to receipt of data indicative of completion of comprehensive underwriting of the life insurance policy, access from the data storage device the rules relating to ceding portions of risk on life insurance policies; determine a second amount of risk ceded and a second reinsurance premium amount based on the received data indicative of completion of comprehensive underwriting of the life insurance policy and the rules; and provide an output signal indicative of the second amount of risk ceded and the second reinsurance premium amount.

In an embodiment, a computer system for administration of applications for life insurance includes a processor in communication with a network via a hardware communications link and a memory storage device in communication with the processor. The processor is configured to: provide an output signal via the network to a user-accessible device including instructions for display of prompts for data sufficient to constitute an application for life insurance for issue before comprehensive underwriting and to authorize a premium payment; responsive to receiving, via the network from the user-accessible device and responsive to the prompts, data indicative of an application for life insurance, including application data, and affirmative or negative responses to a plurality of questions relating to health of a proposed insured, and to receiving data indicative of receipt of a premium payment, determine whether the application is complete and determining, based on the responses to the plurality of questions, whether the proposed insured is eligible for life insurance for issue before comprehensive underwriting; responsive to determining that the application is complete, and the proposed insured is eligible, provide an output signal via the network to the user-accessible device indicative of issue of a life insurance policy and access to policy documents for the life insurance policy; and responsive to receiving data indicative of a result of comprehensive underwriting, provide an output signal via the network to the user-accessible device indicative of access to one or more policy documents for the life insurance policy.

In an embodiment, a computer-implemented method for administration of life insurance, includes providing by a processor an output signal via a network to a user-accessible device including instructions for display of prompts for data sufficient to constitute an application for life insurance for issue before comprehensive underwriting and to authorize a premium payment; responsive to receiving by the processor, via the network from the user-accessible device and responsive to the prompts, data indicative of an application for life insurance, including application data, and affirmative or negative responses to a plurality of questions relating to health of a proposed insured, and to receiving data indicative of receipt of a premium payment, determining by the processor whether the application is complete and determining by the processor, based on the responses to the plurality of questions, whether the proposed insured is eligible for life insurance for issue before comprehensive underwriting; responsive to determining that the application is complete, and the proposed insured is eligible, providing by the processor an output signal via the network to the user-accessible device indicative of issue of a life insurance policy and access to policy documents for the life insurance policy; and responsive to receiving data indicative of a result of comprehensive underwriting, providing by the processor an output signal via the network to the user-accessible device indicative of access to one or more policy documents for the life insurance policy.

In an embodiment, a non-transitory computer-readable medium has computer-readable instructions thereon which, when executed by a processor, cause the processor to: provide an output signal via a network to a user-accessible device including instructions for display of prompts for data sufficient to constitute an application for life insurance for issue before comprehensive underwriting and to authorize a premium payment; responsive to receiving, via the network from the user-accessible device and responsive to the prompts, data indicative of an application for life insurance, including application data, and affirmative or negative responses to a plurality of questions relating to health of a proposed insured, and to receiving data indicative of receipt of a premium payment, determine whether the application is complete and determining, based on the responses to the plurality of questions, whether the proposed insured is eligible for life insurance for issue before comprehensive underwriting; responsive to determining that the application is complete, and the proposed insured is eligible, provide an output signal via the network to the user-accessible device indicative of issue of a life insurance policy and access to policy documents for the life insurance policy; and responsive to receiving data indicative of a result of comprehensive underwriting, provide an output signal via the network to the user-accessible device indicative of access to one or more policy documents for the life insurance policy.

In an embodiment, a computer system for issue and administration of life insurance policies has a processing module, comprising a processor, for receiving data indicative of an application and an initial premium payment from a proposed insured for life insurance for issue prior to comprehensive underwriting and for determining, based on the received data, whether the proposed insured is eligible for issue of life insurance issued prior to underwriting; an administration module, comprising a processor, for, responsive to a determination by the processing module that the proposed insured is eligible, administering a comprehensive underwriting process; and for determining risk data based on a result of the comprehensive underwriting process; and an issuance module, comprising a processor, for issuing a life insurance policy to the proposed insured responsive to the determination by the processing module that the proposed insured is eligible.

In an embodiment, a computer-implemented method for issue and administration of life insurance policies, includes: receiving by a processing module, comprising a processor, data indicative of an application and an initial premium payment from a proposed insured for life insurance for issue prior to comprehensive underwriting; determining by the processing module, based on the received data, whether the proposed insured is eligible for issue of life insurance issued prior to underwriting; administering by an administration module, comprising a processor, responsive to a determination by the processing module that the proposed insured is eligible, administering a comprehensive underwriting process; determining by the administration module risk data based on a result of the comprehensive underwriting process; and issuing, by an issuance module, comprising a processor, a life insurance policy to the proposed insured responsive to the determination by the processing module that the proposed insured is eligible.

In an embodiment, a computer system for determining commission data for life insurance policies includes a data storage device for storing rules relating to determining commissions payable to brokers by an insurer in connection with life insurance policies; and a processor in communication with the data storage device and configured to, responsive to receipt of data indicative of issuing of a life insurance policy issued prior to completion of comprehensive underwriting, access from the data storage device the rules relating to determining commissions, determine a first commission amount based on the received data indicative of issuing of a life insurance policy issued prior to completion of comprehensive underwriting and the rules, and provide an output signal indicative of the first commission amount, and responsive to receipt of data indicative of completion of comprehensive underwriting of the life insurance policy, access from the storage device the rules, and determine a second commission amount based on the received data indicative of completion of comprehensive underwriting of the life insurance policy and the rules, and provide an output signal indicative of a second commission amount.

In an embodiment, a computer system for determining commission data for life insurance policies includes a data storage device for storing rules relating to determining commissions payable to brokers by an insurer in connection with life insurance policies; and a processor in communication with the data storage device and configured to, responsive to receipt of data indicative of issuing of a life insurance policy issued prior to completion of comprehensive underwriting, access from the data storage device the rules relating to determining commissions, determine a first commission amount based on the received data indicative of issuing of a life insurance policy issued prior to completion of comprehensive underwriting and the rules, and provide an output signal indicative of the first commission amount, and responsive to receipt of data indicative of completion of comprehensive underwriting of the life insurance policy, access from the storage device the rules, and determine a second commission amount based on the received data indicative of completion of comprehensive underwriting of the life insurance policy and the rules, and provide an output signal indicative of a second commission amount.

In an embodiment, a system for life insurance administration includes at least one policy administration device having a processor and a communications interface, the policy administration device configured to receive data indicative of an application for life insurance and an initial premium payment via the communications interface from a proposed insured for life insurance, the received data being transmitted from at least one handheld communications device operated by the proposed insured; the policy administration device further configured to determine via the processor whether the proposed insured is eligible, and responsive to a determination that the proposed insured is eligible, provide an output signal to a policy generation computer system for generation of first policy documents for transmission to the handheld communications device; the policy administration device further configured to enable a comprehensive underwriting process and process via the processor a rating of the proposed insured; and based on the determined rating, provide an output signal via the communications interface to the policy generation computer system for generation of second policy documents to the handheld communications device operated by the proposed insured.

BRIEF DESCRIPTION OF THE FIGURES

FIG. 7 is a schematic diagram of a computer system for implementation of a method and system.

FIGS. 8A and 8B illustrate a system for administration of life insurance policies and exemplary screens generated by the system.

FIG. 15 is a flow diagram of an exemplary process performed by a server computer administering a life insurance application submitted from a handheld device.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical computer systems and methods for underwriting and administration of life insurance policies. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

A challenge in connection with comprehensive underwriting is the cost involved. It is undesirable for an insurance company to incur the expense of comprehensive underwriting in cases where the prospective insured may choose not to pay the premium and accept insurance.

In an embodiment, a system of a life insurance company receives an indication of an application for life insurance and an initial premium payment. The indication of an application is accompanied by responses to a set of questions. The questions are posed to identify those prospective applicants for insurance who are aware of facts that would render the prospective applicant not eligible for life insurance issued before comprehensive underwriting. Such facts include having received a diagnosis of or treatment for certain diseases and conditions. If the responses indicate that the prospective insured is eligible, a life insurance policy is issued for the full term of coverage. The policy is issued for the total amount of coverage requested or, if the proposed insured has other in force life insurance coverage, for the maximum amount under the insurance company's policies. The policy may be issued immediately. For example, the policy may be printed and faxed to the broker's office the same day as the application and premium payment are submitted. The policy contains terms permitting the life insurance company to adjust the rating of the prospective insured in response to the results of comprehensive underwriting. After receipt of the results of the comprehensive underwriting, the policy continues in force; the rating and the premium amount may be updated.

Figure 1:
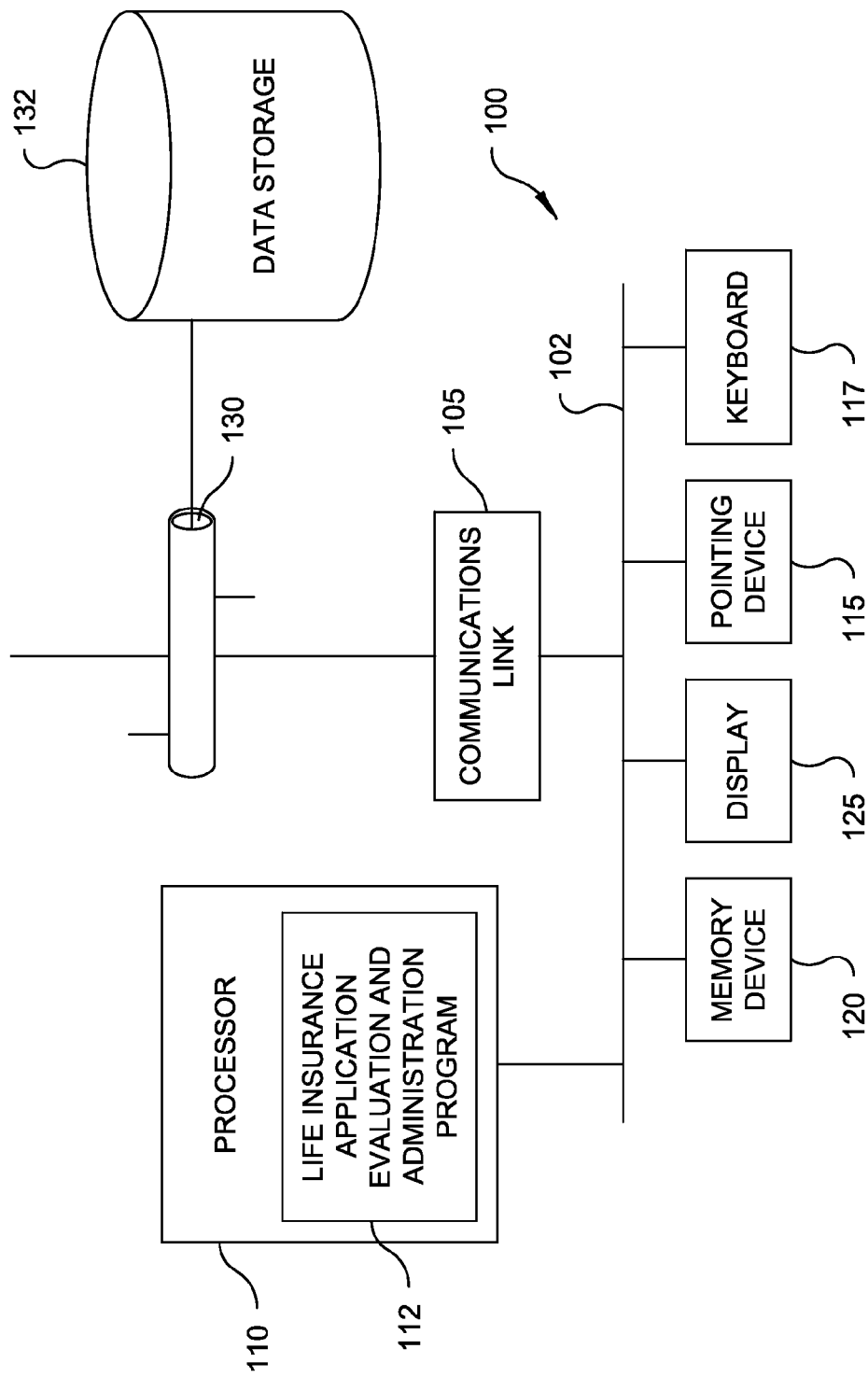
FIG. 1 is a schematic diagram of an exemplary computer system for implementation of a method and system of the invention.

Referring to FIG. 1, an exemplary computer system 100 for use in an implementation of the invention will now be described. In computer system 100, processor 110 executes instructions contained in programs such as life insurance application and administration program 112. Programs may be stored on suitable non-transitory computer-readable media, such as optical or magnetic disks, fixed disks with magnetic storage (hard drives), tapes accessed by tape drives, and other storage media. Processor 110 communicates, such as through bus 102 and/or other data channels, with communications link 105 and memory device 120, receives data from user inputs such as pointing device 115 and keyboard 117, and provides data to outputs, such as data to video drivers for formatting on display 125. Memory device 120 is configured to exchange data with processor 110, and may store programs containing processor-executable instructions, and values of variables for use by such programs. In an embodiment, inputs may include user interfaces, including workstations having keyboards, touch screens, pointing devices such as mice, or other user input devices, connected via networked communications to processor 110. Outputs may include displays and printers. Communications link 105 may communicate with remote sources of information, and with systems for implementing instructions output by processor 110, via local area network (LAN) 130. LAN 130 is merely exemplary, and communication may be by one or more of suitable communication methods, including over wired or wireless local area networks and wide area networks, and communication between networks, including over the Internet. Any suitable data and communication protocols may be employed. Data storage 132, which may include a wide variety of data acquired and processed in accordance with embodiments, is accessed via LAN 130. Data storage 132 may include data concerning individual applications for insurance, criteria for rating applicants for insurance with respect to mortality risk, criteria for setting premiums, and other data by way of example.

Figure 2:
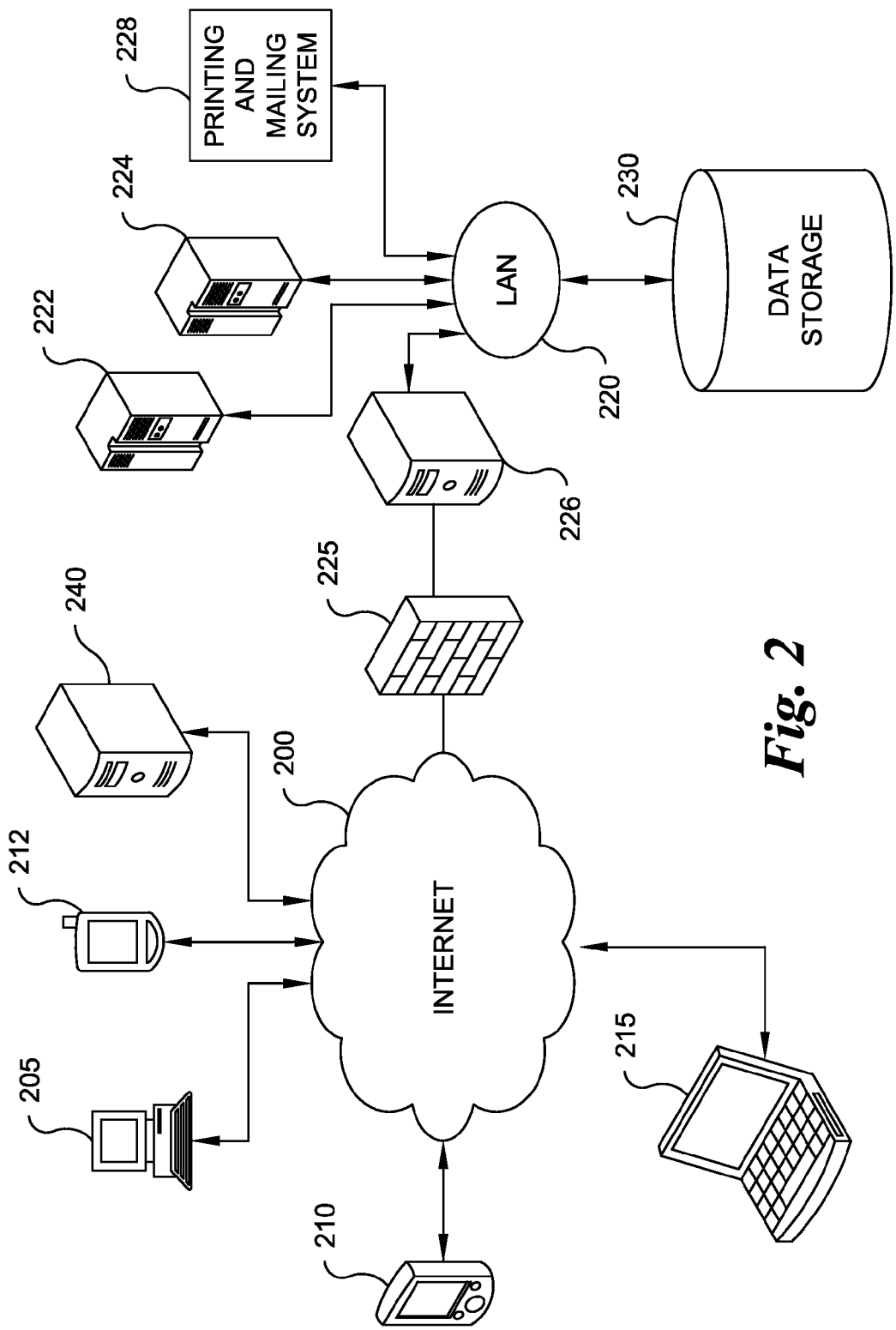
FIG. 2 is a schematic diagram of an exemplary network for implementation of a method and system of the invention.

Referring now to FIG. 2, a schematic diagram of a network arrangement including a client server arrangement for implementation of a method and system in accordance with an embodiment of the invention is presented. In the arrangement of FIG. 2, client devices 205, 210, 212, 215 may be connected via the Internet 200 to server 226. In an implementation, client devices 205, 210, 215 may be personal computers running an operating system such as Windows XP, Windows Vista, or Apple Tiger, thin client devices, portable devices such as personal digital assistants (running the Palm OS, by way of example), cell phones, tablet computers, or other devices. Client device 212 may be a web-enabled smart phone. Client devices may be operated by insurance agents or brokers, or by individual prospective insureds or prospective policy owners, other financial advisors, or by personnel of an insurance or financial services provider. While in this example Internet 200 connects the client devices, in other embodiments, a different network may include, in addition to or in place of the Internet, a corporate intranet, wireless and wired communications channels, and other network features. Firewall unit 225 may be configured to provide data security services with respect to systems and networks, including exemplary server 226 and LAN 220. Firewall unit 225 may include distinct hardware, including a processor and memory device, to provide virus protection and user authentication services, for example. In an embodiment, the devices protected by firewall unit 225 may be systems of an insurance carrier. Server 226 may have a processor that is configured or configurable to receive data, such as data incorporated in applications for life insurance. Server 226 may receive requests to generate life insurance policy documents, and may pass those requests, such as via LAN 220, to another computer system, such as mainframe system 222, which may be based on the IBM/360 platform. Mainframe system 222 may in response to a request and suitable data generate policy documents, which may then be passed in electronic format via LAN 220 to printing and mailing system 228. Printing and mailing system 228 may print and mail documents provided by mainframe system 222, or print and mail illustrations furnished by server 226, among other examples. In an embodiment, policy documents may be transmitted in electronic form to a client system, such as a client system in a broker's office, for printing and delivery to the insured. Policy documents may also be transmitted via fax, or made available on a server for review, with necessary credentials communicated by e-mail or a web page to a client device. Server 226 may run various programs that serve to initiate and monitor sessions with one more of client devices 205, 206, 207. Server 226 may serve for display on client devices 205, 210, 212, 215, prompts to the user for data required to complete applications for life insurance. Client devices 205, 210, 212, 215 may have local application programs that prompt the user to submit information needed for a life insurance policy application and the data necessary to provide instructions for a payment of an initial premium, such as by providing the prospective insured's bank to execute an electronic funds transfer to a bank account of the insurance company.

Server 226 may implement instructions in programs that provide a web front end, linked to back end computer systems for implementing administration of applications for life insurance. For example, mainframe 224 may include programs for administration of applications for life insurance. Data storage 230 may include data received in the application for insurance, data relating to an insurance broker, medical and other reports received during underwriting of the application for insurance, and other data. Server 226 may, by way of example, provide a user with options to obtain a status on the underwriting process, and be configured to receive signals from user device 205, 210, 215 requesting such information, and to communicate such information to back end systems such as mainframe 224 and data storage 230 via LAN 220. Server 226 may in response to a request from a client device, access and serve for display on the client device data relating to a policy, applications for insurance, and the status of the medical underwriting process.

Server 226 may also access third party systems, such as server 240. Server 240 may be a system of a third party. By way of example, server 240 may control access to data records that are accessed during the medical underwriting process.

Figure 3A:
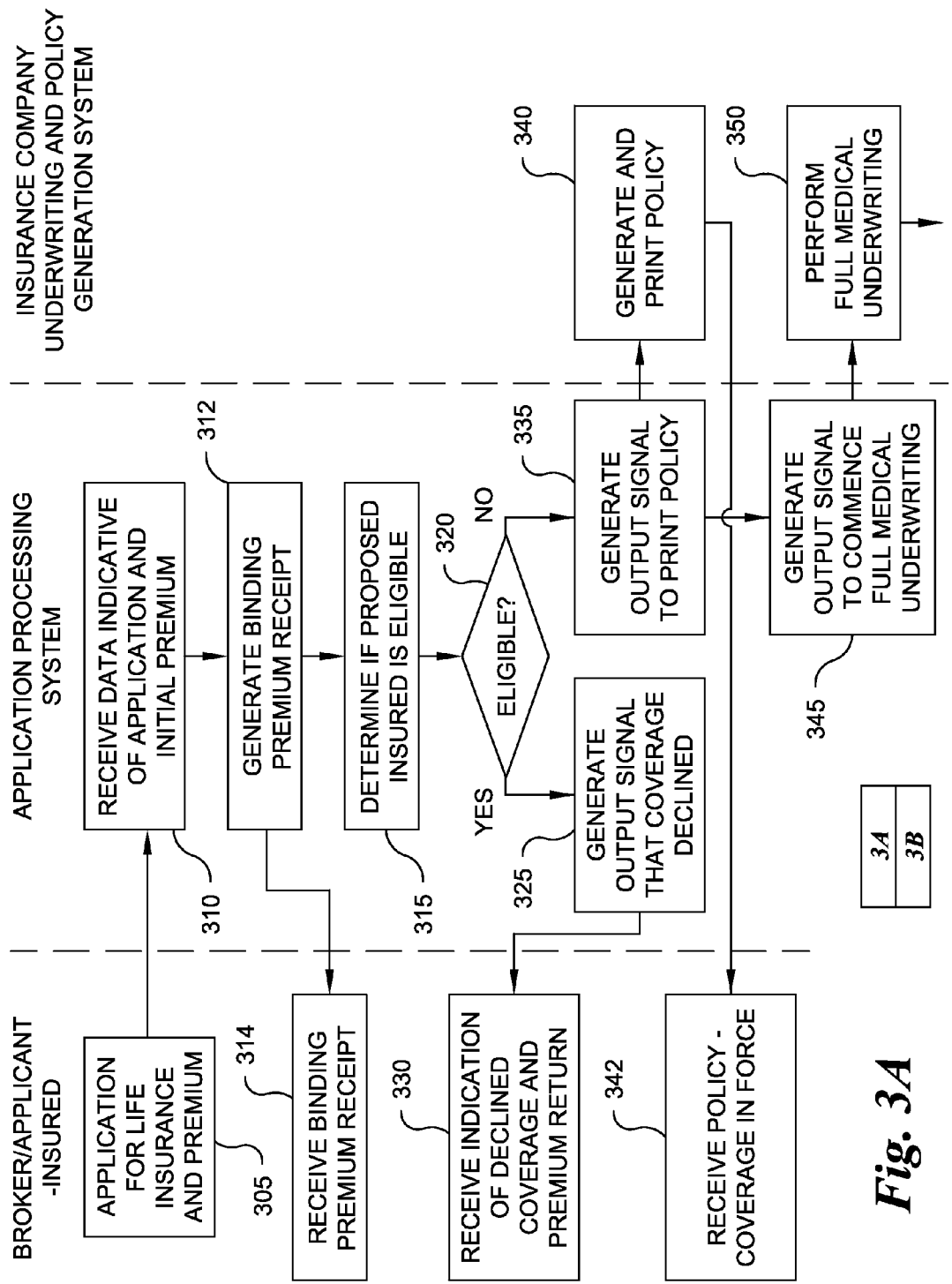
FIGS. 3A-3B are an exemplary process flow diagram of a method according to an embodiment of the invention.
Figure 3B:
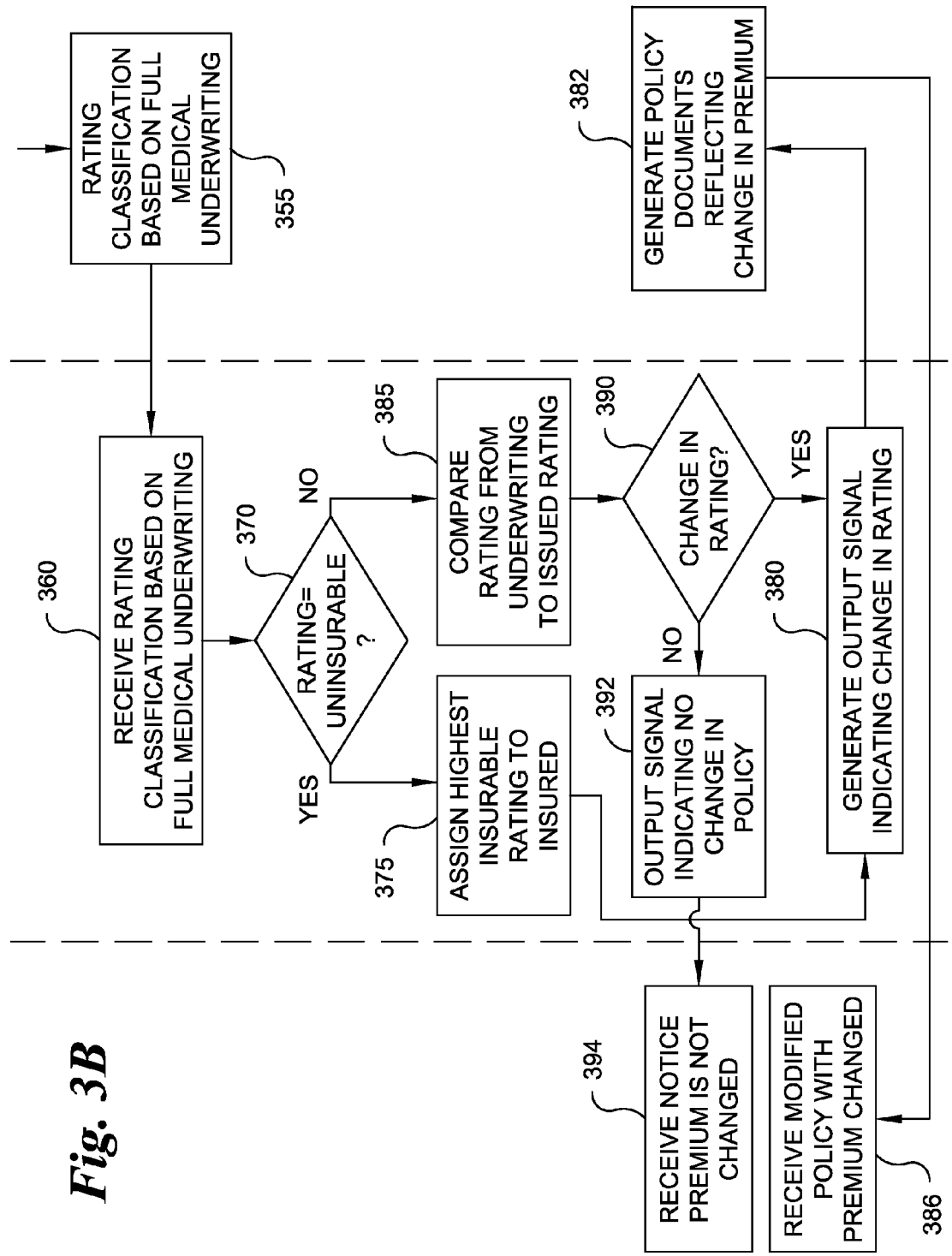

Referring now to FIGS. 3A and 3B, an exemplary embodiment of a method and system according to the invention will be discussed. In an embodiment, a prospective insured seeking life insurance coverage communicates with an insurance broker. The insurance broker may include an independent insurance agent, an agent who represents only a single insurance company, or another insurance agent or representative. References to insurance broker or agent include both individual brokers or agents and entities, such as firms, companies, corporations and partnerships, that server as brokers or agents. The prospective insured selects parameters of the proposed life insurance policy, including the type of policy, e.g., term life, whole life, variable, universal and other variations, riders, additional coverages and the like; a death benefit amount, and other parameters and features. The broker will typically ask the prospective insured certain questions relating to the health of the prospective insured that will affect the rating of the prospective insured. These questions may include: whether the prospective insured is a smoker, the weight of the prospective insured, whether the prospective insured has been treated for certain diseases and conditions; the ages of the parents of the prospective insured at death and the causes of death; whether the parents of the prospective insured have had certain diseases or conditions and the age at which those diseases or conditions were diagnosed. Based on the responses to these questions, the broker will make a judgment as to the likely rating of the prospective insured. Based on the age and gender of the prospective insured and the likely rating, as well as the various features of the desired policy, the broker will identify one or more policies and insurers, and the likely premiums associated with those policies.

In an embodiment, the broker may work with the prospective insured to complete a questionnaire for a life insurance policy. In an embodiment, the questionnaire may include a limited set of questions regarding the health of the prospective insured. The responses to these questions indicate whether the prospective insured has knowledge of any facts which would render the proposed insured not eligible for life insurance that is issued prior to comprehensive underwriting. An individual not eligible for life insurance issued prior to comprehensive underwriting is an individual who has a health or medical condition that places the individual in one of two categories. A first category is an individual who has a sufficiently short life expectancy, in accordance with actuarial data, that the insurance company will not issue a policy. An example is an individual that has a diagnosis of cancer that, because of stage and/or type, is likely to be fatal within a period of years. Further examples are an HIV positive diagnosis, treatment or evaluation within the past five years for certain cancers, hepatitis, heart surgery, stroke, and major neurological diseases, such as Alzheimer's. A second category of individual is someone who has a risk factor that creates uncertainty as to the individual's likely longevity. Examples include non-routine medical treatment, medical treatment for rare conditions, treatment for alcohol and drug abuse, and recent diagnosis of a condition with an uncertain mortality prognosis of certain cancers, such as prostate cancer.

In order to identify individuals who are not eligible for life insurance issued prior to comprehensive underwriting, a series of questions may be posed to a proposed insured individual to identify one or more of these risk factors. The questions may be posed on a printed paper and completed by the proposed insured, or on behalf of the proposed insured by a broker or other representative. The questions may be posed on a display of a client accessible device, such as a display of a networked computer system or a display of a smart phone or other handheld device. The responses may be provided via input blocks on screens, for example. The questions may be provided so as to have affirmative or negative responses, or may take a different form. The questions may be not more than 10 questions, in an embodiment.

The data indicative of information furnished by the proposed insured relating to health of the proposed insured may include binary affirmative or negative responses of the proposed insured to questions relating to the health of the proposed insured. In an embodiment, the data indicative of information furnished by the proposed insured relating to health of the proposed insured may be exclusively binary affirmative or negative responses of the proposed insured to questions relating to the health of the proposed insured.

The application for life insurance will include other necessary information, such as the amount of the requested death benefit, the type of insurance policy, e.g., universal life, whole life, identity of at least one beneficiary, and basic information regarding the proposed insured, such as date of birth, address and gender. In embodiments where a maximum death benefit is limited prior to completion of comprehensive underwriting, the application may include a first requested death benefit for the policy at issue and a second, higher requested death benefit for the policy after completion of comprehensive underwriting.

In an embodiment, a broker may transmit the completed application for life insurance, including responses to questions indicative of knowledge of facts which would render the proposed insured not eligible for insurance issued prior to completion of comprehensive underwriting, and a premium. A computer system receives 310 data indicative of the application and the initial premium. Upon receipt of the application and premium, a binding premium receipt is generated 312. The computer system may provide an output signal having data indicative of the binding premium receipt to a computer system that is provided for generation of insurance documents. The binding premium receipt may be printed and delivered to the insured 314. The binding premium receipt signifies that insurance coverage is provided to the insured pending issue of a policy or a decision by the insurer to decline coverage and return of the premium. The coverage pursuant to the binding premium receipt is in effect from receipt of the binding premium receipt by the insured until receipt by the insured of the policy or a returned premium. The binding premium receipt serves as a temporary insurance agreement.

A binding premium receipt does not result in the computer system engaging in all of the steps associated with issue of a policy. By way of example, upon issue of a policy, a computer system may provide an output signal to a computer system for calculation of commissions to calculate a commission on the policy. Upon issue of a binding premium receipt, no instruction is provided for calculation of a commission. No commission is due to an agent or broker based on issue of a binding premium receipt. Upon issue of a policy, a computer system may provide an output signal to a computer system for administration of reinsurance for determination of data related to reinsurance. Issue of a binding premium receipt does not trigger a signal to a reinsurance administration computer system. Issue of a binding premium receipt does not trigger a requirement to cede all or a portion of the risk to a reinsurer.

The computer system applies predetermined rules to the responses to questions for eliciting knowledge of facts which would render the proposed insured not eligible for issue of a policy prior to comprehensive underwriting. The computer system may have stored criteria for determining, based on the responses to the questions whether the proposed insured is eligible for issue of a life insurance policy prior to completion of comprehensive underwriting. For example, if there are 10 questions, particular answers to all 10 questions, to at least 9 of the questions, and so forth, may be required in accordance with the criteria for the proposed insured to be eligible. A processor of the computer system may access the criteria from a memory storage device. The computer system may determine 315 whether the proposed insured is eligible. The determination of eligibility may be based exclusively or partly on self-reported information relating to the health of the proposed insured provided by the proposed insured. The computer system may receive data indicative of information furnished by the proposed insured relating to the health of the proposed insured. In an embodiment, the data indicative of information furnished by the proposed insured relating to the health of the proposed insured may be exclusively, or may include, binary affirmative or negative responses of the proposed insured to questions relating to the health of the proposed insured. Questions relating to the health of the proposed insured may include questions relating to whether the proposed insured has been declined for life insurance or assigned a rating classification higher than a standard rating classification in connection with an application for life insurance. If the proposed insured is determined to be not eligible 320, then the system generates an output signal 325 having data indicative of instructions to notify the broker that coverage has been declined. The output signal may also include instructions to return the premium payment. By way of example, a check writing system may be provided with instructions to generate and mail a paper check to the prospective insured, or to the prospective insured in the care of the prospective insured's broker. The broker may receive 330 the indication that coverage is declined and the returned premium. Upon receipt of the returned premium, coverage under the binding premium receipt terminates.

If the proposed insured is determined 320 to be eligible, the system may generate an output signal 335 having data indicative of instructions to generate a policy. The output signal with instructions to generate a policy may be furnished to a separate computer system responsible for generation of life insurance policies and documents associated with life insurance policies. The output signal may include data indicative of variables needed for generation of the life insurance policy. The data may include data furnished by the broker. The data may include identification of a particular type of policy, name and address of the insured, name and address of one or more beneficiaries, death benefit amounts, identification of one or more riders, and other data customarily employed by a policy generation system. In an embodiment, the policy may be generated having a premium amount based on a rating furnished with the application for life insurance. The policy may include terms and conditions that are specific to policies issued prior to the completion of comprehensive underwriting. For example, such terms and conditions may include terms to the effect that the proposed insured must cooperate with the comprehensive underwriting process, such as by meeting with a medical technician to have blood drawn, provide consents for treating physicians to provide information to the insurance company, and the like. Such terms and conditions may further include terms to the effect that the insurance company may change the rating or rating category of the proposed insured based on the results of the comprehensive underwriting process, and may change the premium based on the rating category change. Such terms and conditions may further include terms to the effect that a rating determined based on the results of the comprehensive underwriting process is retroactive to the policy issue date. Premiums may also be determined retroactively to the issue date based on the rating determined based on the results of the comprehensive underwriting process. In an embodiment, terms and conditions may provide that the insured may obtain a full refund of any premium paid at issue upon receipt of the rating resulting from the comprehensive underwriting process.

The policy generation system may generate 340 a policy. The policy may be printed and provided to a mailing system for mailing to the proposed insured. It will be appreciated that steps of review of the printed policy may be performed prior to mailing. Upon mailing of the policy, the policy comes into effect, and the proposed insured becomes an insured. The coverage under the binding premium receipt terminates simultaneously with the coming into effect of the policy. The insured receives 342 the policy, and learns that the policy is in effect.

The policy may be furnished to the insured in a variety of manners. By way of example, the policy may be printed to an image file, such as a pdf or tiff format image file, which may be transmitted to the insured by e-mail transmission directly to the insured or to the insured's broker to furnish to the insured. The file may be made available on a server, such as on a secure server accessible via a browser using suitable credentials, such as a user identification and password. The address of the secure server, user identification and password may be furnished to the insured via e-mail, fax transmission or other mode of transmission. The policy may be transmitted via facsimile to the insured or to the insured's broker. The broker may present the facsimile transmitted or e-mailed and printed policy to the insured. The policy comes into effect upon furnishing of the policy to the insured. In cases where the insured and the policy owner are different persons, the policy comes into effect upon furnishing of the policy to the policy owner.

The premium in the issued policy may be based on rate tables that set premiums per dollar or other unit value of insurance for each combination of age, gender and rating classification. The premium may be fixed, or may be determined based on a schedule in the policy. The premium may be subject to change in those policies in which the insurance company has the right to change the rates in the schedule from time to time. The policy may be in the nature of a flexible premium policy which permits the policy owner to select a payment amount within a range to obtain a corresponding value of insurance, as indicated, for example, in a schedule or formula in the policy. Rating classifications represent the result of the medical underwriting process. Exemplary rating classifications used by insurance companies include: super preferred, preferred, standard, substandard, preferred-nicotine and standard-nicotine. In general, the higher the rating category, the lower the premium per unit of insurance for a given gender and age. These rating classifications are merely exemplary. The use of rating categories to summarize the results of comprehensive underwriting is also exemplary. For example, numerical values may be employed.

In an embodiment, the rating classification may be based on a rating classification submitted with the application for insurance. A majority of life insurance policies are issued, after comprehensive underwriting, with the same rating classification predicted by the insurance agent. In policies issued using embodiments of a method and system of the invention with a rating classification predicted by an agent, the policy rating classification is often as predicted by the agent. The premium is thus as predicted by the agent.

In an embodiment, the premium for the policy as written and prior to comprehensive underwriting may have a value different from the value that would be determined based on a rating classification submitted with the application for insurance. For example, the premium may be based on a distinct schedule applicable to policies issued in accordance with an embodiment of the system and method disclosed herein.

In another embodiment, a policy issued in connection with a method and system of the invention may have a rating classification used only for those policies until comprehensive underwriting is complete. For example, the rating classification may be designated as "insurable." The payment made with the application may be a premium for a year of coverage using the insurable rating classification. In an embodiment, the policy may provide for insurance coverage without charge for an initial period, such as 60 days, 90 days or 120 days, sufficient to allow time for comprehensive underwriting. If the policy owner, after receiving the results of comprehensive underwriting, and within the initial period, elects not to continue the policy, the premium paid may be refunded in full.

In an embodiment, payment is made with the application by paper check. In another embodiment, payment is made with the application by debit card. Payment may be made in other modes, such as electronic funds transfer, credit card, money order, cash, transfer from another account with the insurance company, transfer from another account, such as a 1035 exchange, or other modes.

The policy provides for coverage for all causes of death, subject to customary exclusions, such as the customary exclusion for death by suicide during an initial period. The policy is not limited for example, to accidental causes of death.

At the time of issue of the policy, the system may provide an output signal having instructions for payment of a commission to the broker. The suitable commission amount may be calculated by a separate system based on stored data reflective of terms for calculation of commissions applicable to the broker. In an embodiment, the calculated commission amount may be furnished to a suitable payment processing system for printing and mailing of a check to the broker, or for providing instructions to the insurance company's bank for electronic funds transfer to an account of the broker. In other embodiments, the calculated commission amount may be included in a periodic, such as monthly, reconciliation of all commissions due to the broker, which may be paid by check or electronic funds transfer.

After determining that the prospective applicant is eligible, the system may further provide an output signal with data indicative of commencement of the comprehensive underwriting process. The comprehensive underwriting process may be administered independently of the process for receiving and providing a policy issue decision. In the comprehensive underwriting process, a limited physical examination is typically performed, blood and urine samples are tested, and treating physicians are asked to provide records and information. Information from a variety of commercially available databases regarding the insured's medical history, prescriptions written for the insured, and other information regarding the insured, may be obtained and evaluated. The particular sources of information consulted during the comprehensive underwriting process may vary. The comprehensive underwriting process will involve at least testing of blood samples and a physical exam to verify at least height and weight of the insured. A computer system for administration of a comprehensive underwriting process may administer the comprehensive underwriting process. The application for insurance may include information furnished by the proposed insured that is only used if the policy is issued and comprehensive underwriting is commenced. Such information may include contact information of the treating physician or physicians of the proposed insured, family history of longevity and health conditions, and other information. This information may also be requested from the insured in response to a determination that the proposed insured is eligible for insurance.

When the data resulting from the comprehensive underwriting are received, the insurance company's underwriters evaluate the data and either assign 355 a rating category to the insured, or determines that the insured is uninsurable. The comprehensive underwriting process is complete upon the assignment of the rating or the determination that the insured is uninsurable. As the insured has responded to questions designed to identify those insureds who are aware of facts that would render them uninsurable, the determination that the insured is in fact uninsurable will very likely be because of information regarding the insured's health determined during the comprehensive underwriting process. For example, the results of blood or urine testing or a physical examination may identify a chronic disease or a potentially terminal illness that was not known to the insured.

The rating category or uninsurable status is received 360 by the system. Upon receipt of the rating category, if the insured has been determined 370 to be uninsurable, the system assigns 375 to the insured the rating category that is appropriate for the highest risk of death, and hence the highest premium cost per unit of insurance. For example, in a rating category system in which substandard is the rating category for insureds having the highest risk of death, then an insured who has been determined to be uninsurable is assigned to the substandard rating category. If the insured is not uninsurable, then the system compares 385 the rating category assigned during underwriting to the rating category associated with the policy. If the rating category assigned during underwriting is the same as the rating category associated with the policy, then an output signal having data indicative that there will be no change in the premium, or other change in the policy, may be provided 392. The output signal may result in a notification that is received by the insured and/or a broker that there will be no change in the premium or other change in the policy 394. By way of example, referring to FIG. 2, an output signal may be provided by mainframe system 222 to printing and mailing system 228 to print and mail via postal mail a letter to the insured and/or the insured's broker stating that the comprehensive underwriting process has been completed and that there will be no change in the policy premium.

Referring again to FIG. 3B, if the system determines that there is a difference between the rating category assigned during underwriting and the rating category associated with the policy, then an output signal is generated having data indicative of the change. The output signal may be provided to the policy generation system of the insurance company for generation of policy documents, such as policy amendments or endorsements reflecting a premium revised to reflect the change in rating. In an embodiment, no term or condition of the policy is changed resulting from comprehensive underwriting. Policy provisions, including, by way of non-limiting example, term, death benefit amount, cash value and formulas for determination of cash value, exclusions, and riders are not changed.

In an embodiment, the policy, on issue, may have one or more provisions relating to the performance of comprehensive underwriting. These provisions may be modified or removed after the completion of comprehensive underwriting. These provisions may be modified or removed even if there is no change in the premium. By way of example, the policy provisions may impose certain requirements on the insured with respect to cooperation with comprehensive underwriting, and may cause the policy to terminate within a certain time period, in some cases after written notice from the insurance company to the insured, if the necessary steps are not taken. The policy provisions will permit the insurance company to change the premium amount in response to the results of the comprehensive underwriting process. In an embodiment, the policy generating system may issue amendments or endorsements indicating that these provisions are no longer applicable. In an embodiment, the policy at issue includes a schedule of premiums including premiums for amounts of insurance at an insurable rating associated with the policy until the completion of comprehensive underwriting, and premiums for insurance at various rating classifications that are assigned upon completion of comprehensive underwriting.

If there is a change in premium, the insured and/or the insured's broker receives the amended policy documents indicating a change in premium. In an embodiment, the insured may have a time period, such as five days or ten days, to return an executed endorsement so that the policy remains in force. The policy will remain in force so long as the insured complies with premium payment obligations. If the insured fails to make further premium payments, the policy will lapse in accordance with its terms. In the event a signal is received from a policy administration system that the policy has lapsed, a system may calculate a charge back of all or a portion of any commission amount previously paid to the broker. Similarly, if the proposed insured fails to cooperate with the comprehensive underwriting process, a system may calculate a charge back of all or a portion of any commission amount previously paid to the broker.

The issue of policies before comprehensive underwriting is likely to result in fewer instances in which the insurance company bears the expense of comprehensive underwriting for a proposed insured who decides not to accept the policy. The insurance company will have an offsetting additional cost in insuring individuals who would not qualify for insurance after the comprehensive underwriting process. The present value of the cost of providing a death benefit for a life insurance policy issued after comprehensive underwriting may be equal to the following sum:

Present value of standard death benefit =

$$\sum_{t=0}^{N} NAR_t \times v^t \times {}_tp_{x(standard)} \times \mu_{x(standard)}(t)$$

where NAR is the Net Amount at Risk, which is equal to the total death benefit less the cash value of the policy. The term t is the year of the policy, and N is the number of years that the policy will be in force. The term $v^t$ is a factor representing the present value at time t. The term ${}_tp_x$ is a probability of survival of a life at age (x) at issue of the policy to year (x)+t. Such probabilities are derived from actuarial tables, and are well known in the actuarial field. The term $\mu_x(t)$ is the force of mortality of a life, at age (x) at issue of the policy, in year (x)+t. The force of mortality for a year is the likelihood of an insured dying during the year.

The present value of the cost of a death benefit for a life insurance policy issued prior to comprehensive underwriting may be represented as:

Present value of death benefit using new system =

$$\sum_{t=0}^{N} NAR_t \times v^t \times {}_tp_{x(new)} \times \mu_{x(new)}(t)$$

Since the insureds under a policy issued before comprehensive underwriting will include insureds with a higher mortality risk, compared to insureds under policies issued after comprehensive underwriting, the force of mortality for any given year will be at least as great as the force of mortality using standard approaches; this relationship may be expressed as: $\mu_{x(new)}(t) \geq \mu_{x(standard)}(t)$ Since there is a higher mortality risk, the likelihood that the insured is alive in any given year is no greater than using the standard approach; this relationship may be expressed as: ${}_tp_{x(standard)} \geq {}_tp_{x(new)}$.

Embodiments of the method and system of the invention will result in the percentage of policies subject to comprehensive underwriting that are continued in force by the insured after the insured is advised of the results of comprehensive underwriting, being higher than the percentage of policies that are issued after comprehensive underwriting in prior art standard policies. The rapid issue of the policy will reduce the likelihood of the prospective insured choosing not to proceed with the policy when the results of comprehensive underwriting are received. The cost of underwriting all of the policies using embodiments of a method and system of the invention will be shared over an effectively larger number of policies, and thus over a larger amount of premium income per underwritten application or policy. The underwriting cost per policy that is issued and continued in force will decrease as compared with the underwriting cost per policy that is issued in accordance with prior art procedures.

The unit cost for underwriting may be expressed as $$\text{Underwriting Unit Cost} = \frac{\text{Total Costs Associated with Underwriting}}{\text{Number of Policies Issued}_{standard}}$$

The underwriting unit cost for a method and system according to an embodiment of the invention may be expressed as:

Underwriting Unit Cost (new) =

$$\frac{\text{Total Costs Associated with Underwriting}}{\text{Number of Policies Continued}_{(New)}}$$

The number of policies issued, for a standard number of cases underwritten, is anticipated to be greater employing a method and system according to the invention. This relationship may be expressed as:

Number of Policies Issued$_{New}$ ≥ Number of Policies Issued$_{standard}$

The force of mortality for a method and system according to an embodiment of the invention may be calculated with reasonable certainty. The use of questions eliminates issue of policies to applicants who know that they have diseases or conditions rendering them uninsurable or not eligible for life insurance issued before comprehensive underwriting, and therefore avoids the risk of anti-selection or adverse selection. The risk of anti-selection or adverse selection arises if those who know that they are uninsurable believe that they can obtain life insurance by applying for life insurance issued before comprehensive underwriting, and therefore applications from uninsurable individuals exceed the percentage of uninsurable individuals in the general population. Individuals who know that they are uninsurable would include those that have been diagnosed with, treated for or evaluated for a serious illness that would render the individual's anticipated life span so short or so unpredictable that insurance companies will not issue life insurance on the individual's life. The percentage of uninsurable individuals that are not aware that they are uninsurable may be predicted from actuarial statistics well known in the field, so that the mortality risk associated with a method and system of the invention may be determined with a high degree of accuracy.

In an embodiment, the policy may issue within one business day after receipt of the application and premium. In an embodiment, the policy may issue within five business days after receipt of the application and premium. In an embodiment, the policy may issue on the same business day as receipt of the premium and application. In an embodiment, the policy may issue in real time, such as within a minute or an hour of submission of the application information and the premium. In an embodiment in which the decision whether to issue the policy is made and communicated with a minute or less than an hour, there may not be a binding premium receipt. In an embodiment, the comprehensive underwriting process may require approximately the time required in the prior art, such as about 35 days.

The number of questions, which may be phrased so as to require affirmative or negative responses, in order to apply for life insurance for issue prior to comprehensive underwriting, may be ten or fewer. In an embodiment, responses to additional questions may be provided by the proposed insured at the time of submission of the application. The responses to the additional questions may be employed in the comprehensive underwriting process. The responses to additional questions may include additional health information, such as height, weight, age and health conditions of parents and siblings, contact information for treating physicians, diagnoses and treatments for additional conditions or symptoms, and other health-related information.

In a method and system of the invention, a policy remains in effect even if the comprehensive underwriting process determines that the insured is uninsurable. An individual who is uninsurable has a mortality risk that is too high for the insurance company to insure at the insurable risk category having the highest mortality risk. The mortality experience for policies issued in accordance with embodiment of a method and system of the invention is thus likely to be higher than the mortality experience for life insurance policies issued only after comprehensive underwriting. The cost to the insurance company of the death benefit will be greater than for policies issued only after comprehensive underwriting. As explained above, the method and system of the invention is advantageous because of a reduction in costs of comprehensive underwriting associated with policies that never issue.

Figure 4:
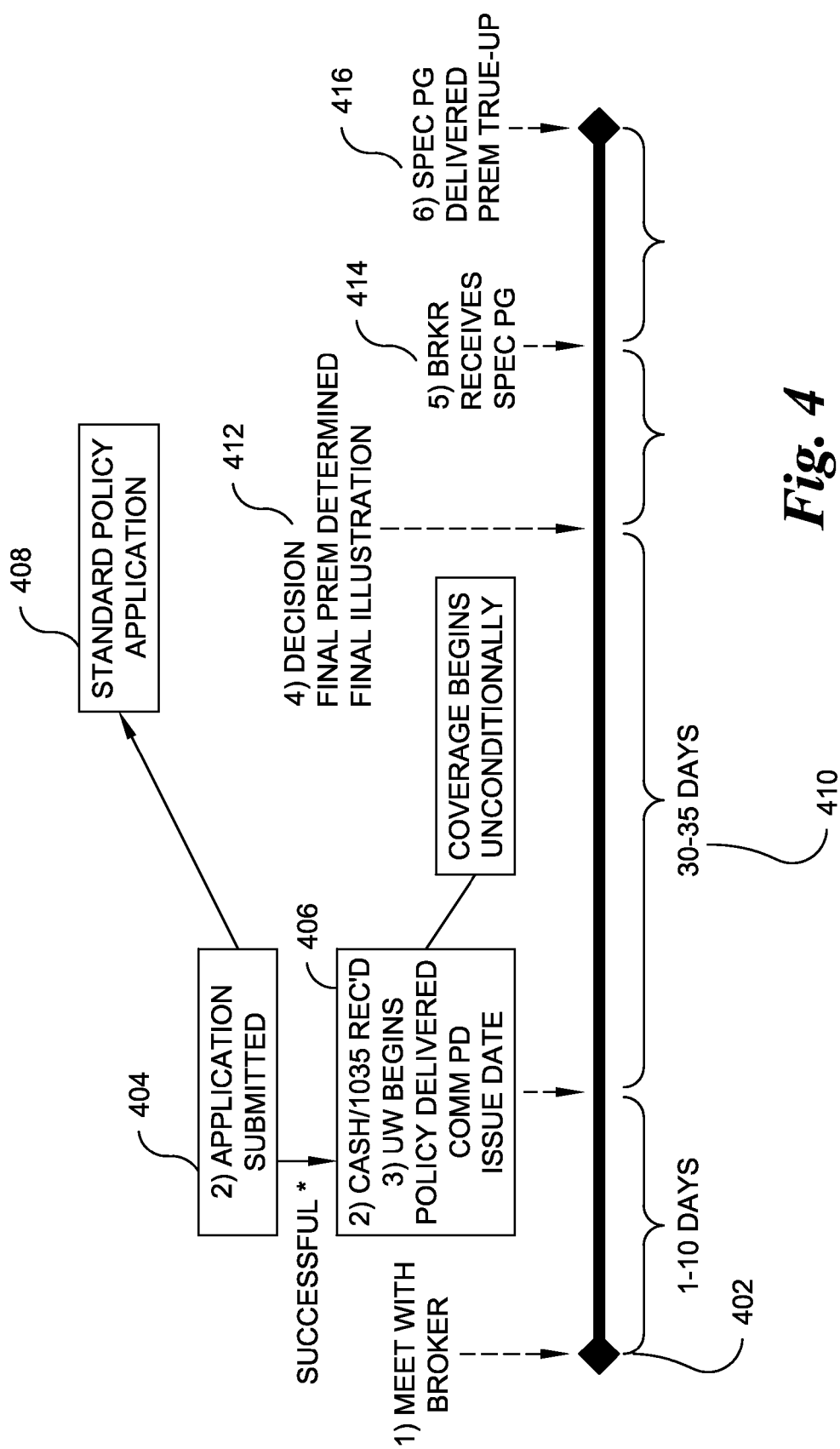
FIG. 4 is a timeline showing timing of steps in an embodiment of the invention.

Referring to FIG. 4, a timeline is shown of an embodiment of a method and system. At 402, the proposed insured meets with an agent or broker, who obtains information, provides illustrations, and assists the proposed insured with submission of the application 404 and the initial premium payment 406. The initial premium payment may be, for example, the calculated premium due for one year of coverage. At this point, a binding premium receipt may be issued by the insurance company, such that the proposed insured has insurance coverage, but without a policy. If a decision is made to issue a policy, then a policy may be issued, and a commission is paid to the broker. If the conditions for issue are not met, the application may proceed 408 according to a different submission process. In an embodiment, the policy may be initially issued the day of submission of application and premium, or within a period of calendar or business days thereafter, such as one, two, three, four or five days. The commission may be paid to the agent or broker upon issue of the policy, or within a period of time after issue of the policy. During the comprehensive underwriting process 410, taking about 30 to 35 days, the insurance company obtains information on the proposed insured, such as through databases, blood and urine sample testing, questionnaires and interviews with treating physicians, in-person examination by medical technicians, and other ways. The process is completed at 412. At that time the rating classification is determined, and a final illustration may be delivered to the insured. The final illustration may include the rating and the premium rates. Any additional pages of the policy are delivered to the broker 414, and then delivered to the insured 416. The additional pages may include any changes to any existing pages, any additional pages, such as pages pertaining to riders that come into effect only upon completion of comprehensive underwriting, and pages pertaining to rates applicable to the policy. The difference between the actual first year premium and the premium paid at issue is reconciled by payment to the insurance company or payment to the insured. In an embodiment, a time period may be provided to the insured after delivery of the final illustration to the insured or broker/agent, to communicate to the insurance company, directly or via an agent or broker, a decision to continue the policy. By way of example, a physically or electronically countersigned endorsement may be required. In an embodiment, if the insurance company does not receive an affirmative response within the time period, the insurance company may permit the policy to lapse. In an embodiment, the terms of the policy may change to the final terms only upon receipt by the insurance company of an indication, such as a signature on a copy of a delivery package, or a physically or electronically signed endorsement, that the insured has accepted the policy. In an embodiment, a proposed insured may be required to sign an endorsement, either physically or electronically, and return to the insurance company a physical or electronic signature of the endorsement for the policy to continue with changed final terms.

Figure 5:
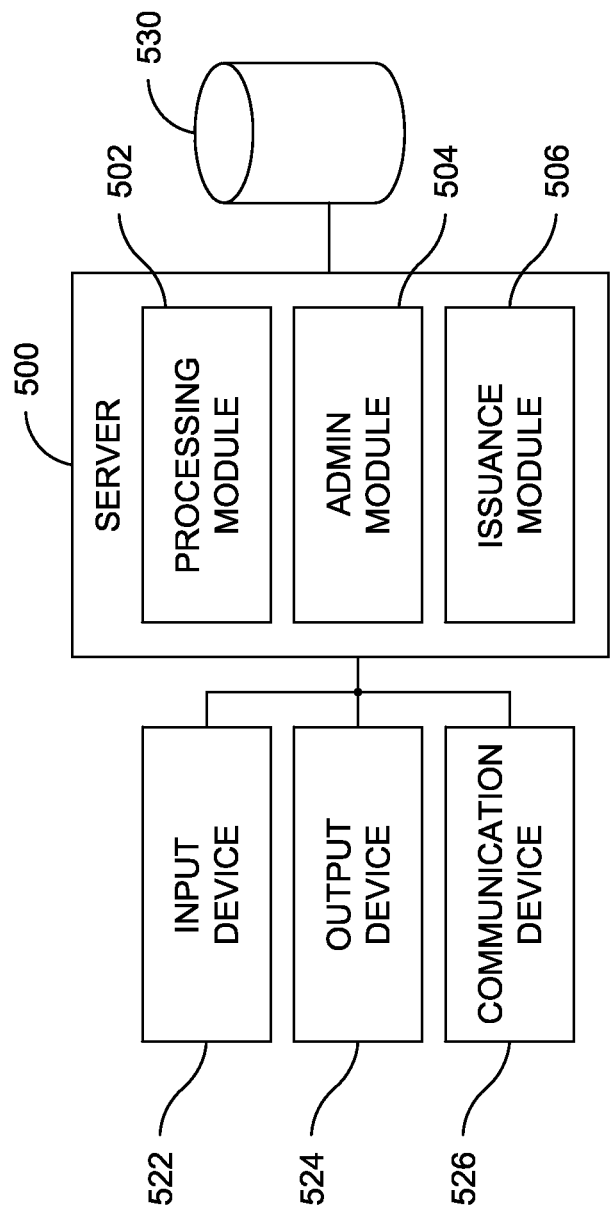
FIG. 5 is a schematic diagram of an alternative server-based computer system for implementation of a method and system of the invention.

Referring to FIG. 5, a computer system for implementation of a method and system of the invention is shown. Server 500 has processing module 502, administration module 504 and issuance module 506.

Processing module 502 is for receiving data indicative of an application and an initial premium payment from a proposed insured for life insurance and for determining, based on the received data, whether the proposed insured is eligible for insurance issued prior to comprehensive underwriting. Administration module 504 is for, responsive to a determination by the processing module 502 that the proposed insured is eligible, administering a comprehensive underwriting process, and for determining a rating classification based on a result of the comprehensive underwriting process. Processing module 502 may pass data relating to the application, if the prospective insured is not eligible for a life insurance policy under the method and system of the invention, but still may meet insurability requirements, to other systems of the insurance company for processing of the application according to the insurance company's standard procedures. Administration module 504 may monitor performance of the collection and evaluation of data in the comprehensive underwriting process. Administration module 504 may further assign an insurable rating classification to the insured on issue of the policy; the initial premium payment is for one year of coverage at the insurable rating classification. Administration module 504 is further for, upon receipt of data indicative of cancellation of the policy by the insured within an initial period, causing a refund of the premium to be paid to the insured. Issuance module 506 is for issuing an insurance policy to the proposed insured responsive to the determination by the processing module that the proposed insured is not uninsurable or is eligible for insurance. Administration module 504 may calculate commissions payable to a broker at the time of issue of the policy, and issue instructions to a payment system to effect a payment, or provide data indicative of instructions to update a broker's account with a credit to a system that administers payments to brokers. Administration module 504 may calculate any changes in commission amount after completion of comprehensive underwriting, and provide an output signal to the system for administering payments to brokers of any credits or debits to the broker's account. Administration module 504 may calculate reinsurance premium amounts both on initial issue of the policy and after comprehensive underwriting. Issuance module 506 may furnish the life insurance policy to the proposed insured. The policy may be furnished by printing and mailing a physical copy of the policy, transmitting an electronic file having an image of the policy to the proposed insured, or by making an electronic file having an image of the policy accessible to the proposed insured on a server.

Server 500 is in communication with datastore 530, which may be a local or networked data storage device or a database accessed via a database server. Datastore 530 stores data pertinent to the life insurance policy, including policy terms, owner data, insured data, beneficiary data, broker data, and data related to underwriting and classification.

Server 500 communicates with other devices via communication device 526, and includes user interfaces including input device 522, such as keyboard or mouse, and output device 524, such as a display or printer.

In an embodiment, server 500 may include a communications module, comprising a processor, for providing to one or more insurance process administration computer systems data relating to the issued policy responsive to issue and responsive to determining the rating classification. The insurance process administration computer systems may include one or more of a computer system for generating policy documents, a computer system for determining commissions, or a reinsurance administration computer system, by way of example.

Figure 6:
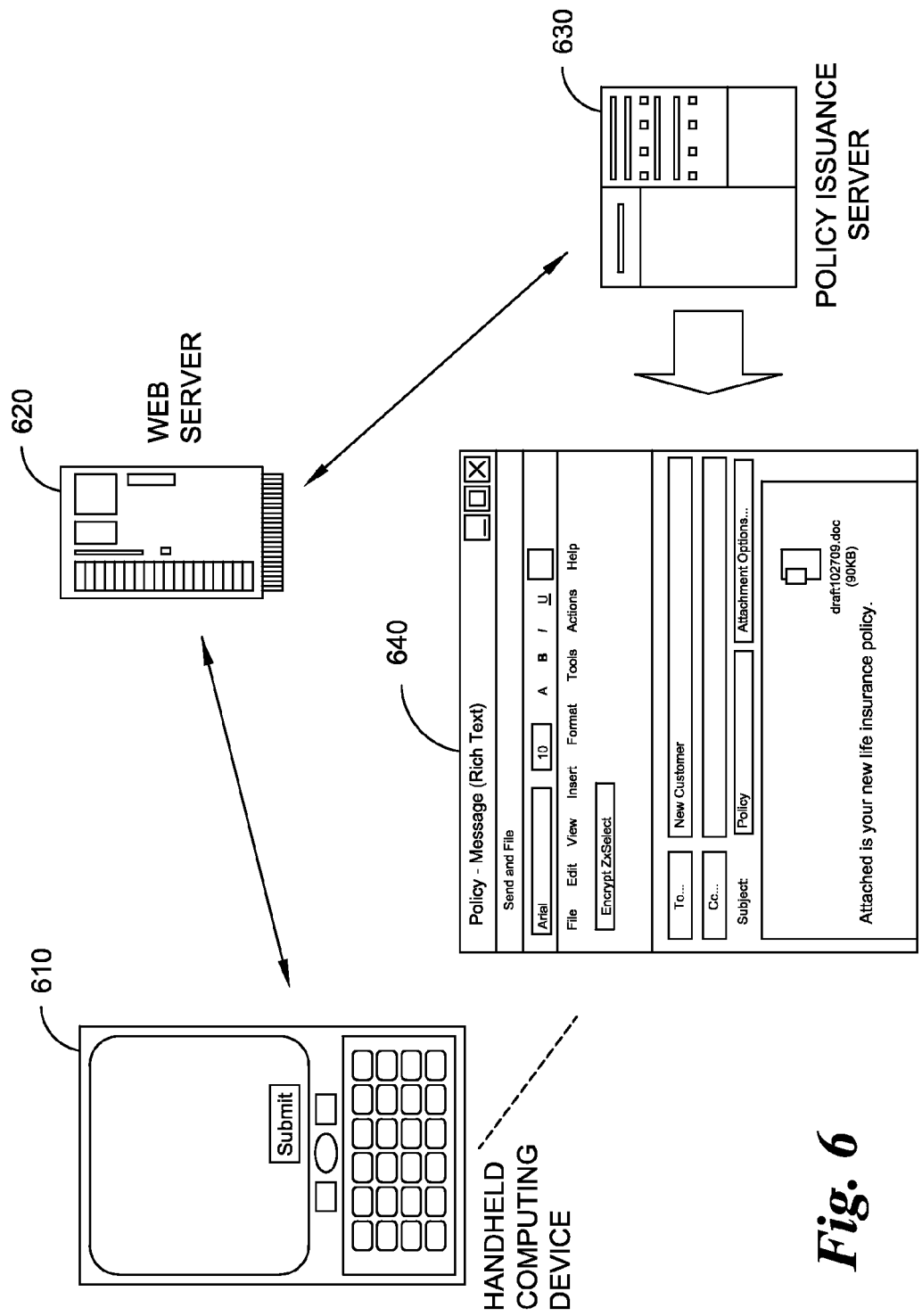
FIG. 6 is a schematic diagram of an implementation of a method and system of the invention for application submission and delivery of policy via a smart phone.

Referring to FIG. 6, an implementation is shown in which an application for life insurance is submitted via a handheld communications device, such as a smart phone 610. The insurance application may be provided as a display, which may be generated via an application program including instructions stored on a memory device within smart phone 610 and executed by a processor within smart phone 610. The user may input the data requested on the display, which data is then received by the processor. In an embodiment, the insurance application may be presented as a browser based fillable form. The pressing of the submit button on smart phone 610 causes the required insurance application data to be wirelessly transmitted over the telephone network and then over other networks, such as the Internet, to web server 620. The smart phone may also be configured to receive bank account information, and to provide a wireless output signal to a proposed insured's bank to transmit funds in the amount of the initial premium payment to the insurance company. The web server provides the data to policy issuance server 630, which processes the data, makes determinations such as whether the submitted information constitutes a complete insurance application and whether the submitted information relating to the health of the proposed insured meets eligibility criteria and, responsive to appropriate determinations, causes a policy to be generated. A web page 640 may then be generated and displayed on smart phone 610, including a link that permits the user to access the life insurance policy. The life insurance policy may thus be issued the same day as submission of the insurance application and premium payment from the user's smart phone. In an embodiment, the handheld communications device is configured to authenticate an identity of the proposed insured, such as via one or more biometric, password and/or security based procedures. In an embodiment, web server 620 and/or policy issuance server 630 may be operated or controlled by an insurance company and/or an agent affiliated or owned by an insurance company. Communications between handheld communications device 610 and web server 620 and/or policy issuance server 630 may be accomplished via one or more secure cryptographic based communications schemes. In an embodiment, a real time help facility may be implemented to facilitate completion of the insurance application and to assist with the policy issuance process via the handheld communications device.

Referring to FIG. 7, an exemplary computer system 700 for administration of insurance policies in accordance with an embodiment is shown. In this embodiment, computer system 700 is implemented as a network of computer systems interconnected via local area network 702. A policy administration computer system 710 is configured to perform a variety of administrative functions related to insurance policies that issue prior to completion of comprehensive underwriting. Functions performed may include adding data to a policy file related to such policies; providing an output signal indicative of placing the policy in force; providing an output signal indicative of an instruction for a suitable system to generate a policy contract; calculation of initial commissions for brokers or other producers; perform a final underwriting determination; activate any applicable riders; providing an output signal indicative of an instruction for a suitable system to generate a final policy contract; and perform calculations to determine any adjusted commissions.

A client information management computer system 714 is in communication with policy administration computer system 710 via LAN 702. Client information management computer system 714 may store, such as in a database on a local or networked data storage medium, data related to an insurance company client. Data may include name, age, date of birth, gender, postal mailing address, telephone numbers, e-mail addresses, the same data and nature of relationships for spouses, children, grandchildren and others who may be beneficiaries under insurance policies, data identifying insurance agents, brokers, financial advisors and other financial and insurance representatives and professionals working with a client, and other pertinent data. Policy administration computer system 710 may access data maintained by client information management computer system 714 in connection with administration of policies.

Underwriting requirements management computer system 720 is in communication with policy administration computer system 710 via LAN 702. Underwriting requirements management computer system 720 is configured to manage a process flow for a comprehensive underwriting process for a policy. As noted above, comprehensive underwriting process may include obtaining information on the proposed insured, such as through databases, blood and urine sample testing, questionnaires and interviews with treating physicians, and in-person examination by medical technicians. Underwriting requirements management computer system 720 may provide user interfaces for input of data relating to the above, one or more databases for storage of such data, providing prompts to users to obtain data employed in the comprehensive underwriting process, perform verifications of received data, and format and output reports of received data and verifications of received data. Underwriting requirements management computer system 720 may be configured to provide, such as via a user interface such as a display or a printer, data acquired during the comprehensive underwriting process to underwriters who evaluate the data and assign a rating classification to the insured. Underwriting requirements management computer system 720 may be configured to receive at a user input, such as a keyboard, mouse or touch screen, rating classification data. Underwriting requirements management computer system may be configured to provide a signal to policy administration computer system 710 including rating classification data and data identifying the policy upon completion of comprehensive underwriting. Underwriting requirements management computer system 720 may be configured to receive the information relating to the health of the proposed insured submitted with the application, and to compare the information from the application with data collected during the comprehensive underwriting process that is known to the insured, such as information from treating physicians and information from databases of prescriptions associated with individuals. Various algorithms can compare the information from the two sources to identify information submitted with the application that may be false, such as a failure to disclose treatment for a disease or condition, as compared with a prescription for a pharmaceutical approved for use to treat that disease or condition. For example, for each pharmaceutical product identified in information from databases of prescriptions associated with the insured, the system 720 may access from memory a stored list of diseases and conditions for which the pharmaceutical product is approved or for which physicians are known to prescribe the product. The accessed list of diseases and conditions may then be compared to the list of diseases and conditions which the insured denied having been diagnosed with or treated for on the application. If there are one or more matches between the two lists, then the system may generate a message to an underwriter for further evaluation for possible fraud. The system may be configured to require the underwriter to provide a decision and supporting reasons before returning a result of comprehensive underwriting to policy administration computer system 710. If the decision is that no fraud is detected, a menu of possible supporting reasons may include: error in database records and product prescribed for other condition per treating physician records. If the decision is that fraud is detected, the computer system 720 may be configured to provide an output signal to computer system 710 indicating that fraud has been detected.

Commissions and accounting computer system 730 is in communication with policy administration computer system 710 via LAN 702. Commissions and accounting computer system 730 receives data relating to commissions from policy administration computer system 710. Data relating to commissions may include commission amounts, payees, policy numbers or other identifying data as to policies, dates for payments, by way of example. Commissions and accounting computer system 730 receives data as to amounts of commissions from one or more additional systems. Commissions and accounting computer system 730 may calculate commissions due to a broker or agent on a periodic basis, such as a monthly basis, and prepare suitable statements identifying commissions owed, credits to the insurance company, and a reconciliation. Commissions and accounting computer system 730 may prepare outgoing messages to payment systems to effect generation of checks or electronic transfers. Commissions and accounting computer system 730 may also be configured to create entries in accounting journals representing commissions and policy payments.

Reinsurance administration computer system 735 is in communication with policy administration computer system 710 via LAN 702. Reinsurance administration computer system 735 is configured to receive data relating to new and modified insurance policies from policy administration computer system 710. Reinsurance administration computer system is configured to apply rules applicable to reinsurance agreements with respect to new and modified insurance policies. An insurance company issuing life insurance policies may have one or more reinsurance agreements pursuant to which a portion of the risk of a policy is transferred, or ceded, to a reinsurer as of the issue date of the policy. In consideration for the ceding of risk, the insurance company pays the reinsurer a reinsurance premium, in an amount based on a formula such as a percentage of the amount of risk ceded, a percentage of the premium charged by the life insurance company, percentages dependent upon a risk classification of the insured, and other formulas.

Applicable rules may be stored in a memory storage device of reinsurance administration computer system 735 and accessed by a processor of reinsurance administration computer system 735. Applicable rules may include that: risk on each policy in excess of a threshold amount is ceded to a particular reinsurer under a particular reinsurance agreement; risk on each policy in excess of a first threshold and up to a second threshold is ceded to a particular reinsurer under a particular reinsurance agreement, and risk on each policy in excess of a second threshold is ceded to a second reinsurer under a different reinsurance agreement. Applicable rules may include that a percentage of the risk of a policy, or a percentage of the risk above a threshold amount, may be ceded to a reinsurer. Applicable rules identify the reinsurer to which risk is ceded on a particular policy. By way of non-limiting example, rules may associate all life policies issued within a particular date window to a particular reinsurer, and may include geographic rules for associating life policies with a particular reinsurer, such as rules based on a state of residence of an insured as of the date of issue. Reinsurance administration computer system 735 may be configured to receive data relating to new insurance policies from policy administration system 710.

Reinsurance administration computer system 735 may be configured to access rules, for each new insurance policy received, apply the rules to determine amounts of risk ceded, applicable reinsurance contract, reinsurance company, and reinsurance premium, as well as any other data determined in accordance with applicable rules. The determined data may be stored in a memory device, such as in a database. Reinsurance administration computer system 735 may be configured to prepare reports of ceded risk and premiums incurred, and to calculate premiums owed to reinsurers. Reinsurance administration computer system 735 may be configured to calculate amounts of payments due to reinsurers, such as by summing amounts due for all or a defined set of policies having risk ceded to a particular reinsurer within a particular time frame, such as a monthly, weekly, or other time frame. Reinsurance administration computer system 735 may be configured to provide output signals indicative of payment amounts to be made to reinsurers.

Reinsurance administration computer system 735 may be configured to provide output signals indicative of payment amounts to be made to reinsurers to payment system 736. The output signals may include data indicative of instructions for payment including amount, date, payee reinsurer, manner of payment, and other required information. The payment system may provide for printing and mailing of suitable paper checks to an address associated with a payee reinsurer, or providing of paper or electronic instructions to the payor's bank to effect an electronic transfer of funds to the payee reinsurer's designated bank account. It will be appreciated that payments made to reinsurers may be made on a periodic basis, such as daily, weekly, or monthly, to reconcile all reinsurance premiums owed by an insurer to a reinsurer.

Policy owner reporting computer system 740 is configured to receive data relating to policies from policy administration computer system 710. Policy owner reporting computer system is configured to format documents related to policies for printing. In an embodiment, policy owner reporting computer system 740 may be configured to store formatted documents as image data files. Policy owner reporting computer system 740 may be in communication with or include data storage devices storing templates of policy-related documents, including policy contracts, riders, correspondence directed to policy owners, and periodic policy statements, such as quarterly and annual statements. A template may be in the form of a document in a digital file format with fields designated for addition of data particular to the policy, such as name of owner, name of insured, name of beneficiary, face amount, death benefit amount, policy effective dates, premium amounts, references to riders, and other fields. Policy owner reporting computer system may be configured to, responsive to receipt of data relating to policies from policy administration computer system 710, access stored rules for selection of one or more of the stored templates, select one or more of the templates in accordance with the rules, populate the templates with data particular to policies, and create formatted files for printing and mailing of policy documents to policy owners, or for providing of image files to policy owners. Policy owner reporting computer system may thus be configured to generate life insurance policies and policy documents, such as policy contracts, correspondence to owners, riders and other documents.

Policy owner reporting computer system 740 may be configured to select for printing upon initial issue of a policy and prior to comprehensive underwriting, selected policy documents. The policy documents printed may be first policy documents relating to the initial issued policy. Policy owner reporting computer system 740 may further be configured to select for printing selected second policy documents upon completion of comprehensive underwriting. In an embodiment, the selected first policy documents for printing upon initial issue of a policy may include policy documents associated with selected riders. The selected second policy documents for printing upon completion of comprehensive underwriting may include policy documents associated with selected riders that are only effective upon completion of comprehensive underwriting. The selected second policy documents for printing upon completion of comprehensive underwriting may include policy documents reflective of rates for insurance coverage.

Examples of riders that are selected for printing upon initiation of a policy may include documents associated with: an overloan protection rider, a policy protection rider, and a policy continuation rider. An overloan protection rider guarantees that the policy will not lapse if policy loans are not prepaid. A policy protection rider provides that the policy will not lapse even if there is not enough account value for monthly deductions and charges, providing the rider requirements are met. A policy continuation rider provides, in a first-to-die policy issues on two insureds, that the survivor can purchase coverage after the death of the first-to-die.

Examples of riders that are selected for printing upon completion of comprehensive underwriting include an accelerated benefit rider, an owner designated settlement options rider, facility care or disability accelerated benefit riders, waiver of deductions rider, waiver of specified amount rider, a cost of living adjustment rider, an accidental disability rider, a term insurance rider, a child rider and a foreign travel exclusion rider.

Policy owner reporting computer system 740 may be configured to print a first version of selected documents upon initial issuance of a policy, and to print a second version of the selected documents.

Policy owner reporting computer system 740 may be configured to associate, with one or more documents, a flag indicative of printing the document responsive to receipt of data indicative of issuing of a policy, and a flag indicative of printing the document responsive to receipt of data indicative of completion of comprehensive underwriting of a policy. A flag may be a variable or a quantity stored in a particular memory location and having either a first value indicative of printing the document responsive to receipt of data indicative of initial issue of a policy, or a second value indicative of printing the document responsive to receipt of data indicative of completion of comprehensive underwriting of a policy. The flag having the first value is referred to herein as the first flag, and the flag having the second value is referred to herein as the second flag. In embodiments, templates may be associated with data indicative of generating and/or printing a document using the template responsive to receipt of data indicative of issuing of a policy, or data indicative of generating and/or printing a document using the template responsive to receipt of data indicative of completion of comprehensive underwriting of a policy, in any suitable manner. Policy owner reporting computer system 740 may be configured to, responsive to a user query, access data including document identifying information, such as document names, and flags, and to format on a user display, document names and associated flags. Policy owner reporting computer system 740 may be configured to receive user inputs including instructions to change flags associated with policy documents, such as between a flag indicative of printing a document in response to receipt of data indicative of issuing of a policy, and a flag indicative of printing the document responsive to receipt of data indicative of completion of comprehensive underwriting of a policy. Policy owner reporting computer system 740 may thus be configured to permit users to provide instructions for selection of an event that triggers printing of a document associated with a life insurance policy.

Policy administration computer system 710 is further configured to output data relating to policies to data store 750. Data store 750 may be configured for storage of data relating to policies in one or more logical databases. The data in the one more logical databases may be stored in one or more physical data storage devices, which may be co-located with one another or located in separate physical locations. Data in data store 750 may be access by financial reporting computer system 755. Financial reporting computer system 755 may employ data from data store 750 in generating documents for financial reporting function of an issuing insurance company.

Policy administration computer system 710 is further configured to output data relating to policies to data store 760. Data store 760 may be configured for storage of data relating to policies similarly to data store 750. Policy owner accessible web server 762 may be configured to receive credentials from policy owners, receive requests from policy owners for data relating to policies, access data store 760 and serve policy data to policy owner client devices via a network. Agent and broker accessible web server 764 similarly furnishes policy data to agent and broker client devices via a network. Web servers 762, 764 may provide data relating to policies, including amounts of coverage in force after issue and prior to completion of comprehensive underwriting, and status of the process illustrated in Fig.

Figure 8A:
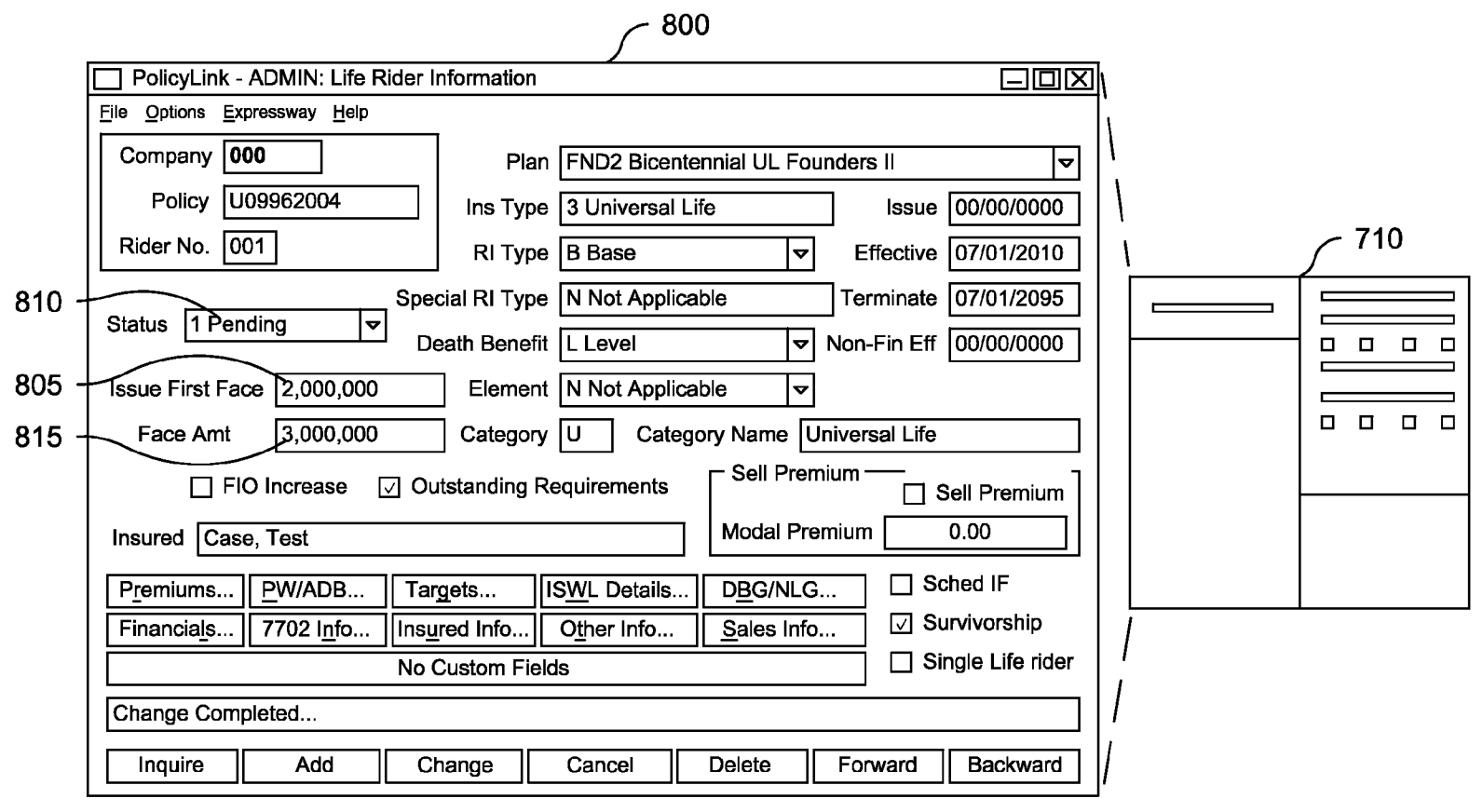

Referring now to FIG. 8A, there is shown display 800 generated by policy administration computer system 710. Display 800 may be generated to a user to prompt the user to enter data relating to a policy to be issued prior to comprehensive underwriting. Display 800 may be populated with data stored in association with a selected policy number and accessed by policy administration computer system 710. In display 800, fields related to policies issued prior to comprehensive underwriting include a face amount field 805 for a face amount for the policy from issue to completion of comprehensive underwriting, status field 810 which may display status entries associated with policies issued prior to comprehensive underwriting. The status entries may include issued and comprehensive underwriting ongoing, issued and awaiting insured response to final illustration, and finally issued, by way of example. A field may be provided for a second face amount 815 that comes into effect after comprehensive underwriting. Fields may be provided for entry and/or display of data elements including an underwriting company name, a policy number associated with the policy, and applicable riders. Drop down menus may be provided for selection of types of plans, risk type, death benefit type, and other data items.

Figure 8B:
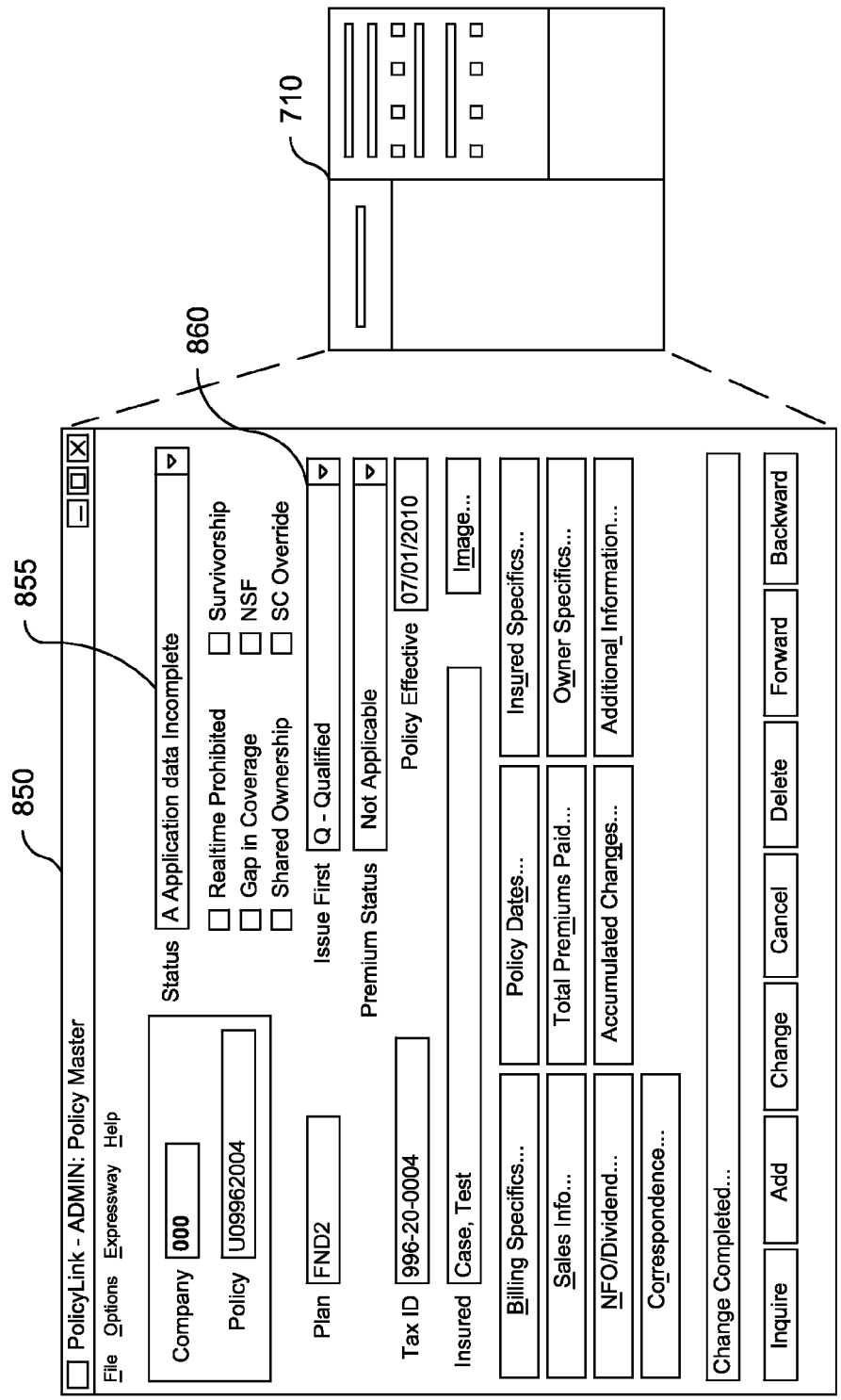

Referring now to FIG. 8B, there is shown display 850 generated by policy administration computer system 710. Display reflects, at field 855, the status that the application data is incomplete. This status may signify that additional data will be needed from the proposed insured before the policy can be generated. The status "qualified" in field 860 indicates that the information received with the application indicates that the insured is eligible for issue of a life insurance policy prior to completion of comprehensive underwriting. If the information received with the application indicated that the insured was not eligible for issue of a life insurance policy prior to completion of comprehensive underwriting, the status in field 860 would indicate that the insured was not eligible.

Figure 9A:
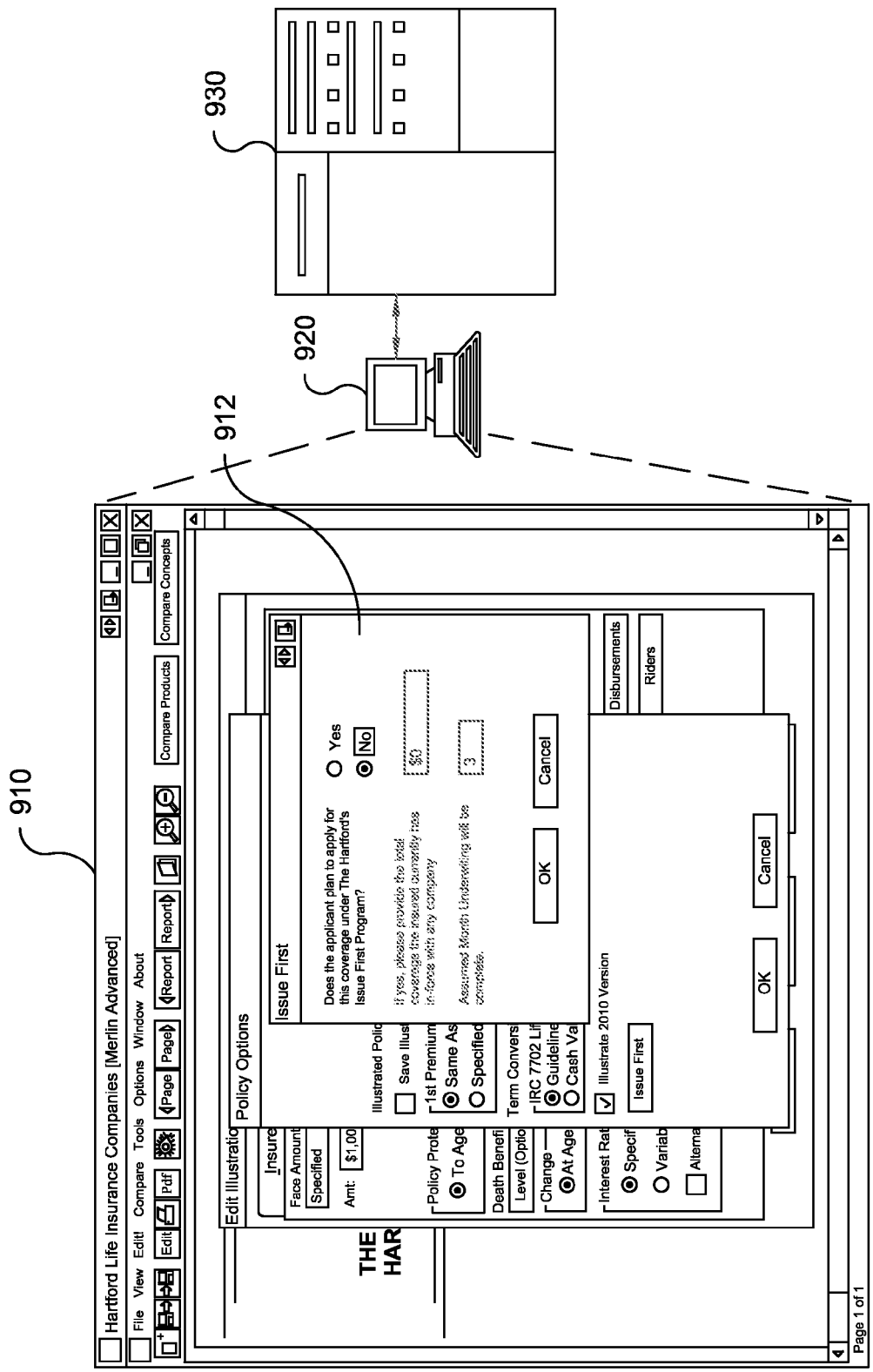
FIGS. 9A and 9B illustrate a system for generation of illustrations for life insurance policies and a exemplary screens generated by the system.
Figure 9B:
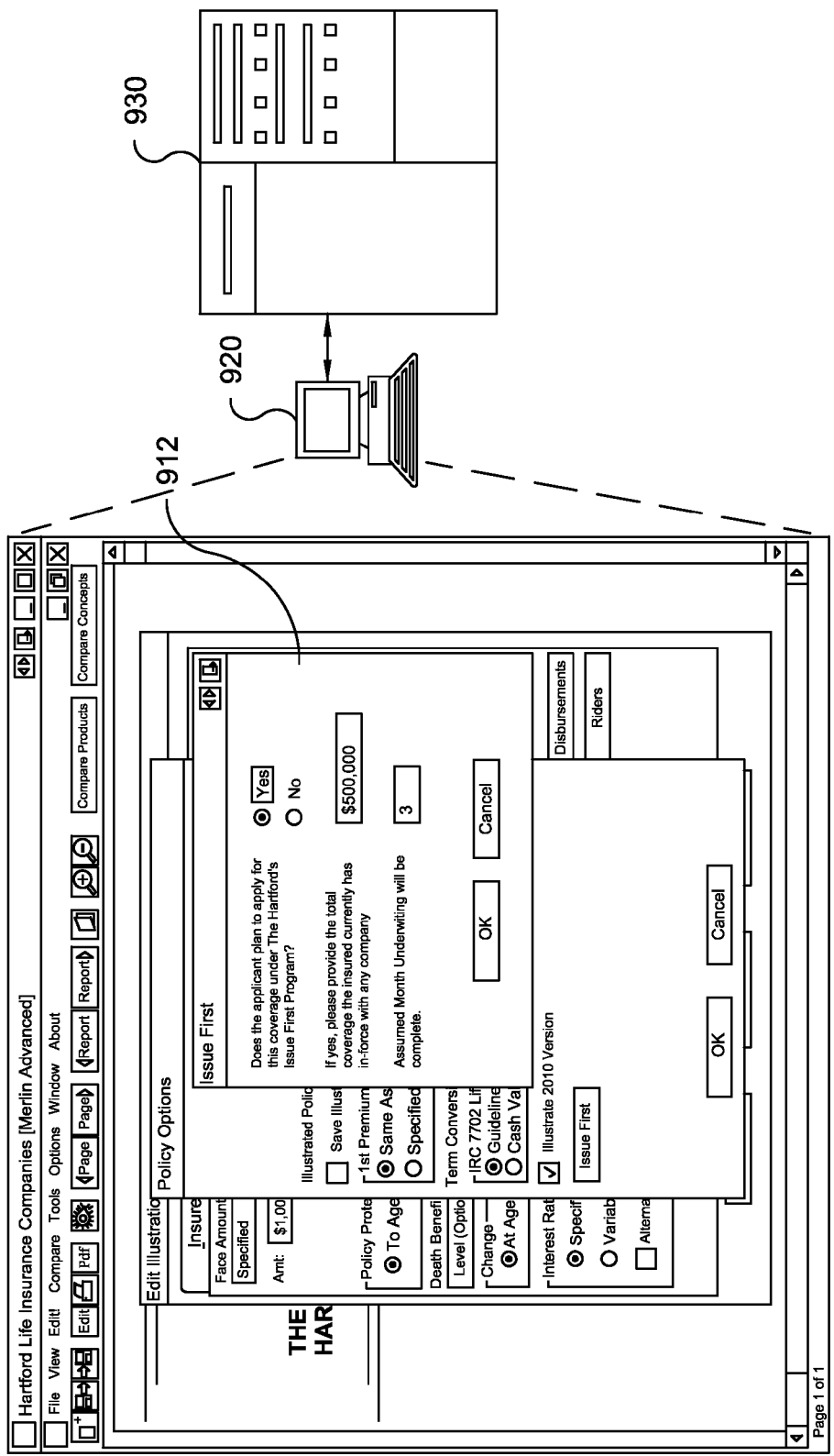

Referring now to FIGS. 9A and 9B, there is shown a screen 910 generated on broker or agent client device 920 by insurer computer server 930 configured to provide a life insurance policy illustration generation system. Server 930 provides prompts on client device 920 for entry of data, including whether the proposed insured wishes to apply for issue of a policy prior to completion of comprehensive underwriting, as shown on box 912. In FIG. 9A, the user has responded in the negative. Box 912 may require, responsive to a user response in the positive, the user to indicate additional data associated with an application for issue of a policy issued prior to completion of comprehensive underwriting. In the example shown in box 912 in FIG. 9B, the user is required to indicate a total amount of life insurance coverage currently in force with respect to the proposed insured, issued by any company. The user may also select, for purposes of an illustration, a period of time, such as a period of months, for completion of the process of comprehensive underwriting.

Figure 10:
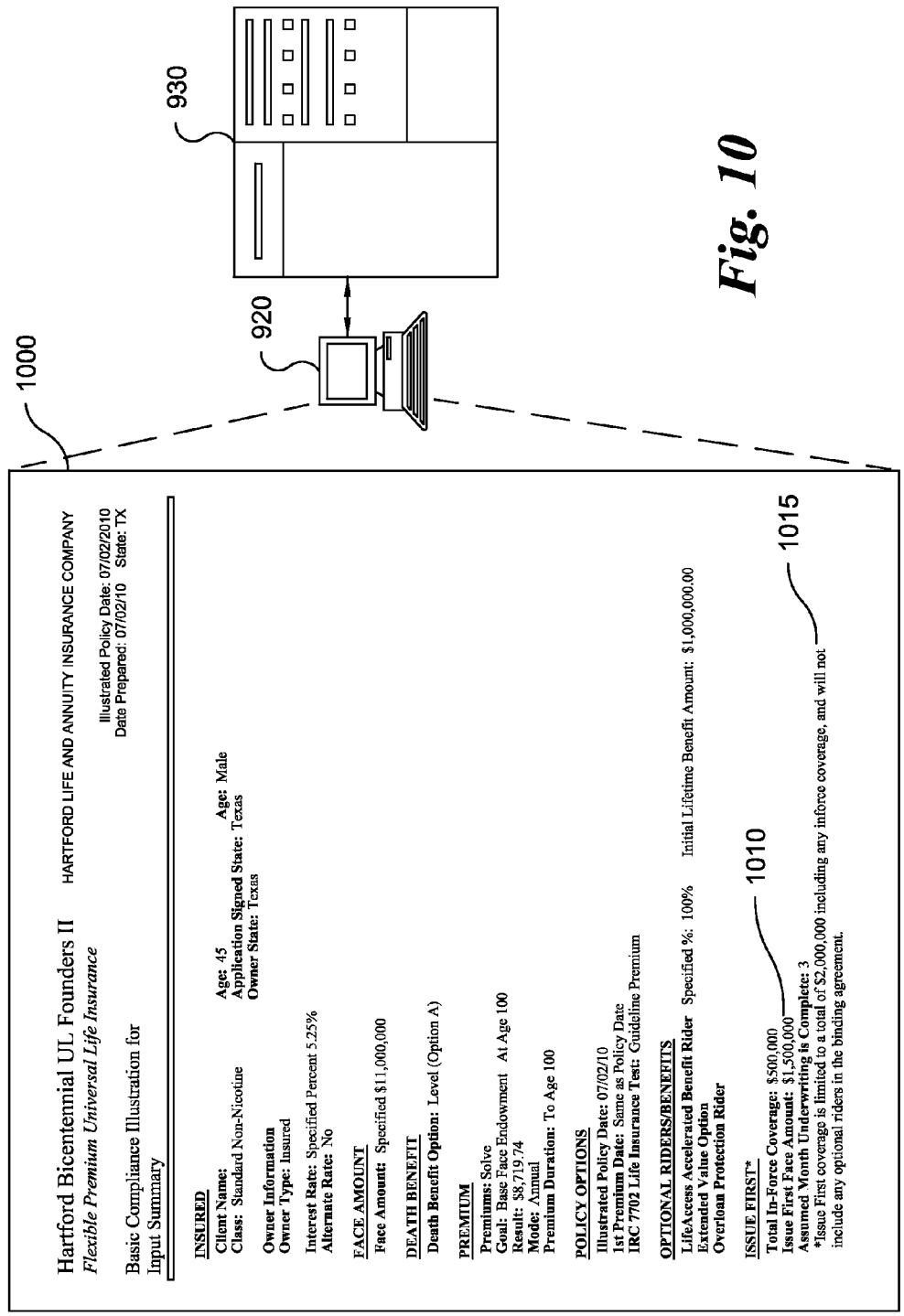
FIG. 10 illustrates a system for generation of illustrations for life insurance policies and an exemplary illustration.

Referring now to FIG. 10, a policy illustration 1000, generated by server 930 for display to a user on client device 920, is shown. Policy illustration 1000 includes terms 1010 relating to issue of the life insurance policy prior to completion of comprehensive underwriting. Server 930 may execute applicable rules in generating policy illustration 1000. By way of example, and as illustrated on the policy at 1015, a rule limiting a total amount of coverage prior to completion of comprehensive underwriting to a selected limit may be applied by server 930 in generation of policy illustration 1000. In an embodiment, policy administration computer system 710 may require that an illustration be generated and delivered to a proposed insured or a broker of a proposed insured before a policy can be issued. In an embodiment, a physical or electronic signature on an illustration must be provided by the proposed insured, and data indicative of the physical or electronic signature on the illustration must be received by policy administration computer system 710 before a policy can be issued. In the example, the data entered in box 912 (of FIG. 9B) for total in force coverage is employed by server 930, together with the applicable rule, to determine the face amount of the policy prior to completion of comprehensive underwriting.

In an embodiment of the implementation discussed above with reference to FIG. 6, an application for life insurance is submitted via a handheld communications device, such as a smart phone. The application may be completed via a local application, in which a processor of the handheld communications device executes instructions stored in a tangible computer-readable medium on the handheld communications device, or via a browser based fillable form. The pressing of the submit button on the handheld device causes the required application data to be submitted to a web server. The handheld device may also authorize a proposed insured's bank to transmit funds in the amount of the initial premium payment to the insurance company. The web server provides the data to a policy administration data, which processes the data, and if appropriate, provides an indication to a policy generation computer system to generate a policy. The policy generation computer system generates a policy, including image files of policy documents, and delivers the image files to the handheld device, either directly, or by furnishing the image files to the web server. The web server may generate and display on the handheld device a web page that includes a link that permits the user to access the life insurance policy and policy documents. Upon completion of comprehensive underwriting, the policy generation computer system may generate image files of suitable policy documents, which may be similarly made available to the user via the handheld device. The life insurance policy may thus be issued the same day as submission of the application and premium payment from the user's handheld device. In an embodiment, the handheld communications device is configured to authenticate an identity of the proposed insured, such as via one or more biometric, password and/or security based procedures. In an embodiment, a web server, a policy issuance server and a policy generation computer system may be operated or controlled by an insurance company and/or an agent affiliated or owned by an insurance company. Communications between handheld communications device and web servers and/or policy issuance servers may be accomplished via one or more secure cryptographic based communications schemes. In an embodiment, a real time help facility may be implemented to facilitate completion of the insurance application and to assist with the policy issuance process via the handheld communications device.

Figure 11:
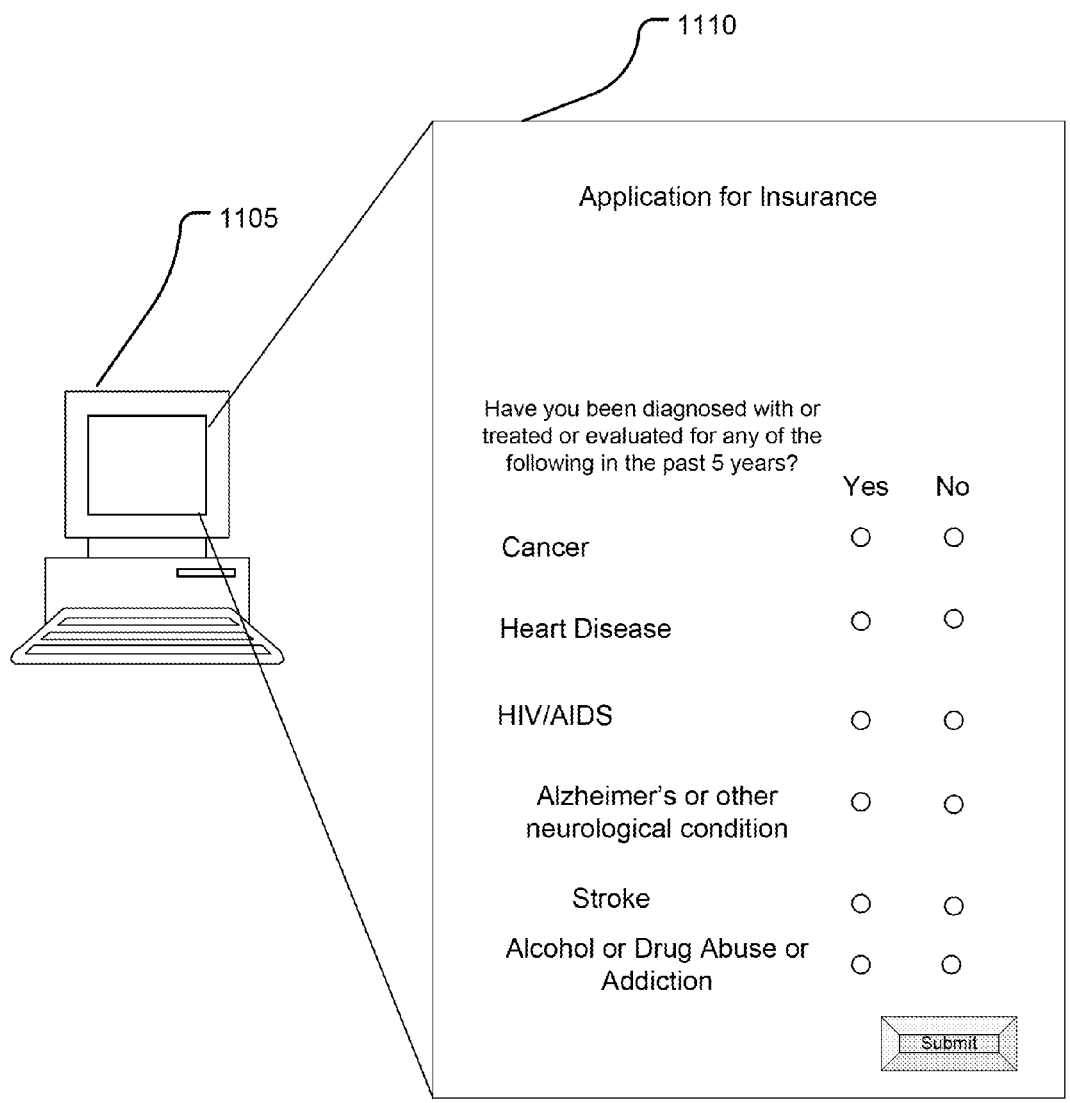
FIG. 11 illustrates a screen in an exemplary application for life insurance.

Referring to FIG. 11, in an embodiment, a client device, such as client computer system 1105 may be caused by a policy administration computer system to display an electronic application for insurance, including exemplary page 1110, which discloses an exemplary list of questions regarding the health of the proposed insured and having affirmative or negative responses. The user, such as the proposed insured or a licensed broker or agent, may submit the responses to the policy administration computer system. The use of the data indicative of the responses may proceed in accordance with the process flow of FIG. 12, for example.

Figure 12:
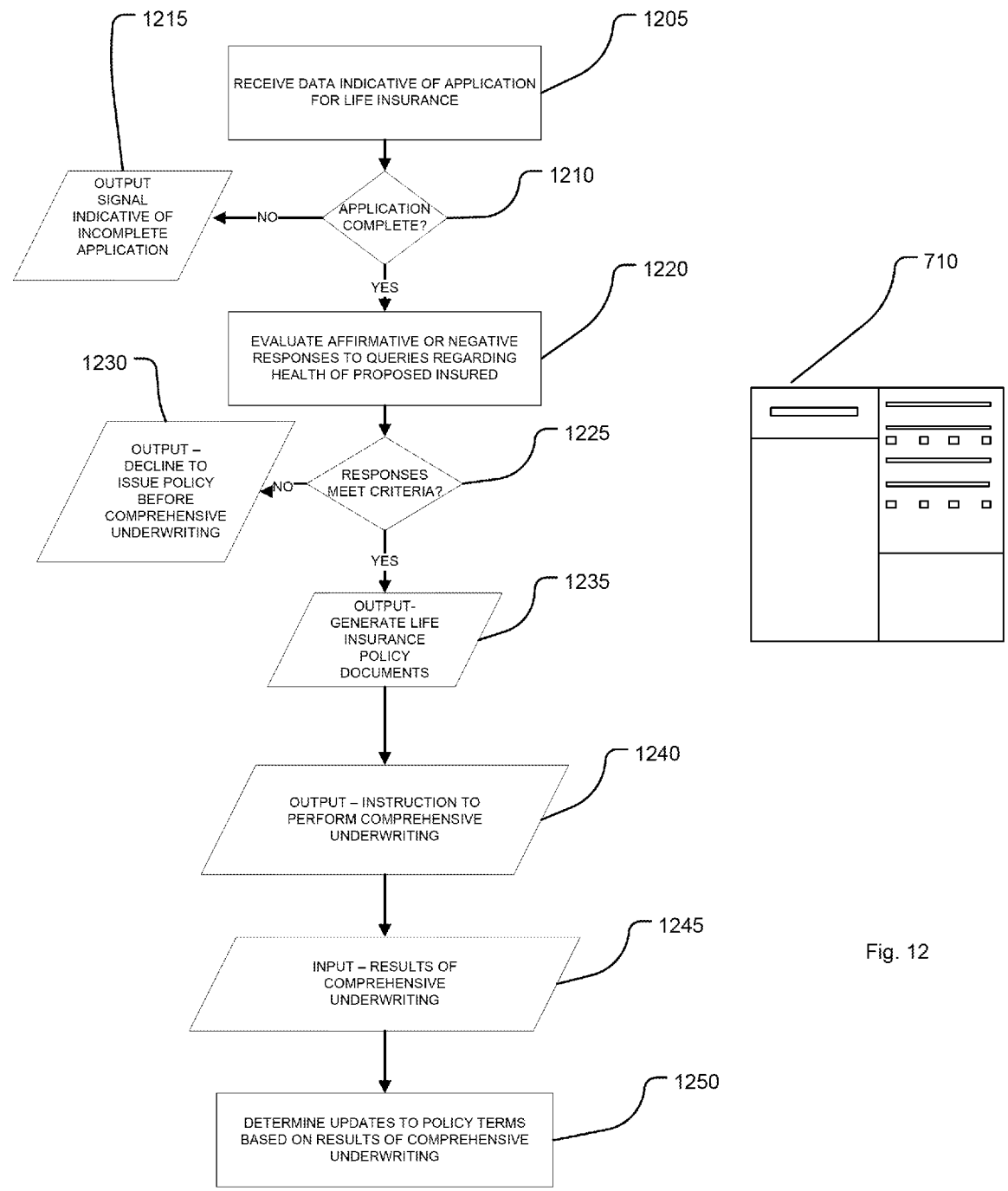
FIG. 12 is a flow diagram of an exemplary process performed by a policy administration computer system.

In an embodiment, a process flow performed by policy administration computer system 710 of FIG. 7 is illustrated in FIG. 12. The policy administration computer system receives 1205 data indicative of an application for life insurance for issue prior to completion of comprehensive underwriting. The data may include data required for a complete application, such as information identifying the proposed insured, the type of insurance policy (e.g., whole life insurance, term life insurance, universal life insurance, variable universal life insurance), a beneficiary, a death benefit amount, and a premium amount. Data required for a complete application may include data indicative that a premium has been paid. Data required for a complete application may include an electronic copy of an illustration and data indicative that the proposed insured has received the illustration. A complete set of affirmative or negative responses to questions relating to the health of the proposed insured may also be required. The policy administration computer system compares the received data to rules for complete applications to determine whether the application is complete 1210. Responsive to determining that the application is not complete, the system provides 1215 an output signal having data indicative of an incomplete application. Responsive to determining that the application is complete, the system evaluates 1220 the affirmative or negative responses to queries regarding the health of the proposed insured to determine whether the responses meet the criteria for a proposed insured who is eligible for life insurance issued before comprehensive underwriting. Responsive to determining 1225 that the responses do not meet the criteria, then the system provides an output signal 1230 having data indicative of an insurer decision to decline to issue the policy before comprehensive underwriting.

Responsive to determining that the responses meet the criteria for eligibility, the system provides an output signal 1235 having data indicative of instructions to generate policy documents. The system further provides an output signal 1240 indicative of instructions to commence a comprehensive underwriting process. In an embodiment, the system may access rules to determine if the policy may be issued before comprehensive underwriting at the requested face value. For example, rules may provide a maximum face value for policies until comprehensive underwriting is complete. Rules may provide a maximum sum of face value for policies issued prior to comprehensive underwriting and face value of other policies already in effect. A maximum age rule may be provided for policies issued prior to comprehensive underwriting.

The system may determine a premium based on a rating classification for policies issued prior to comprehensive underwriting that is different from rating classifications for policies issued after comprehensive underwriting. The premium for the policy may remain in effect until comprehensive underwriting is completed, or for a specified period, such as 40, 45 or 50 days. Charges for requested riders may not be included in the calculated premium amount for the period until the completion of comprehensive underwriting, or for the specified period.

The system receives 1245 data indicative of results of the comprehensive underwriting process 1245. The data indicative of results of the comprehensive underwriting process may include data indicative of risk rating of the insured. The risk rating may include a rating classification. Based on the rating classification and requested death benefit or face value, an updated premium amount may be determined. If the approved face amount is higher than the face amount immediately after issue, the costs may be based on the initial face amount, the risk classification as approved, without riders. If the approved face amount is lower than the face amount immediately after issue, the costs may be based on the face amount after comprehensive underwriting, the risk classification as approved, without riders. Rider charges may be assessed from the effective date of any changes to the family, a monthly anniversary of the policy, or another date. Policy charges may be based on the approved face amount as of the issue date of the policy. The system may provide output signals indicative of communications to the insured to confirm continuation of the policy. Other output signals may be provided to a policy owner reporting system to print and furnish to the insured documents associated with the final insurance policy.

Figure 13:
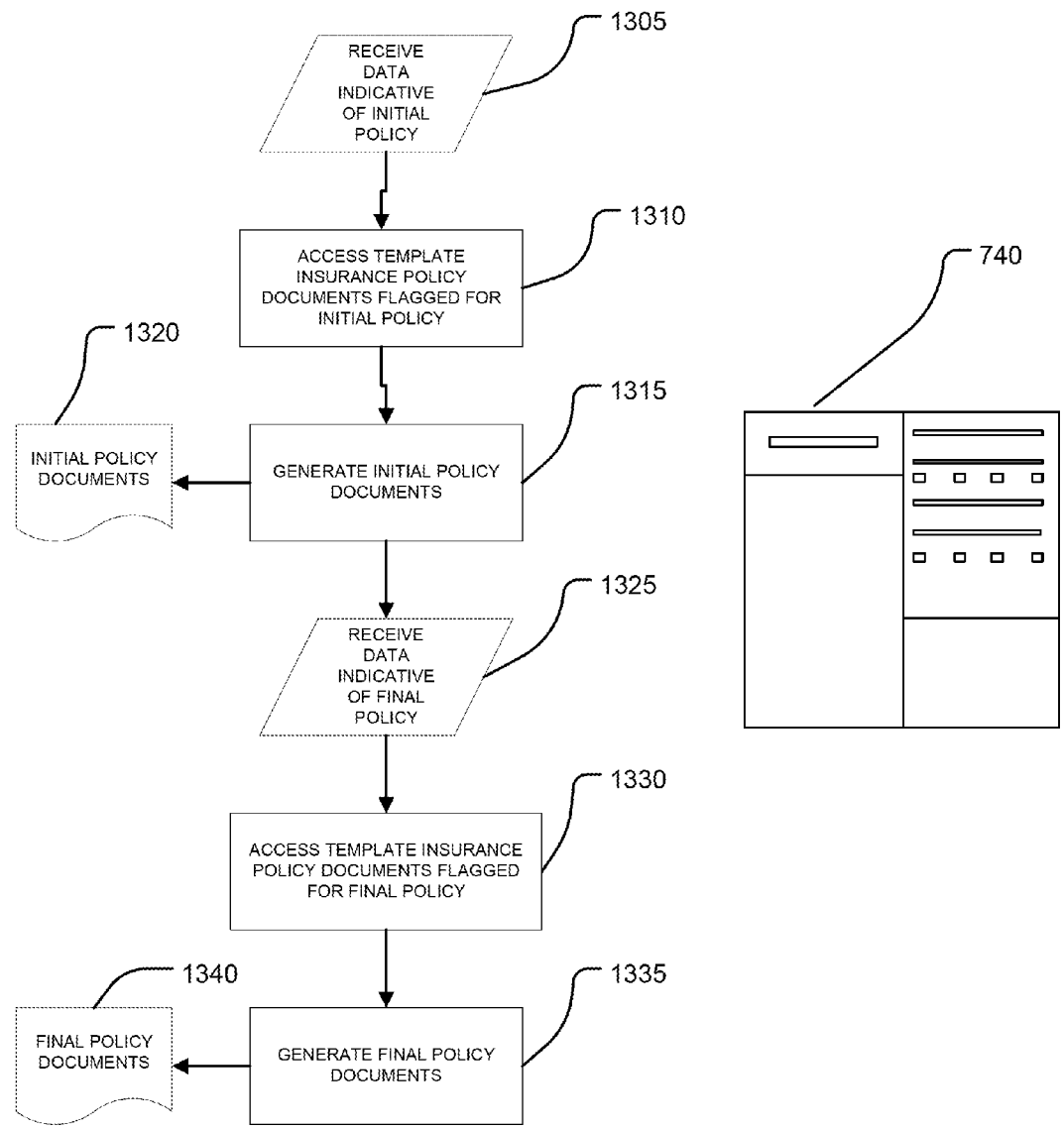
FIG. 13 is a flow diagram of an exemplary process performed by a policy owner reporting system.

Referring to FIG. 13, a flow diagram of a process performed by a policy owner reporting system 740 of FIG. 7 is illustrated. The system receives 1305 data indicative of an initial policy issued prior to comprehensive underwriting. The data may be provided by the policy administration system 710. The received data may include sufficient data to select and print appropriate policy documents. Data may include insured data, beneficiary data, face value or death benefit amount, type of policy and premium amount. The system may access 1310 from a memory device template insurance policy documents flagged to be printed with an initial policy. The system may generate 1315 initial policy documents employing the template insurance policy documents and the received data relating to the initial policy. The initial policy documents are printed 1320, and may be mailed, faxed or otherwise transmitted to the insured, or may be made available to the insured as digital image files.

The system may receive 1325 data indicative of a final policy. The data indicative of a final policy may include changed data relating to policy face value, death benefits, premiums, and other data. The system accesses 1330 from a memory storage device template insurance policy documents flagged for printing with a final policy. The system may generate 1335 final policy documents employing the template documents and received policy data. The final policy documents may include an endorsement that provides, for example, a changed face value and changed premium, and additional riders. The final policy documents 1340 are printed, and may be mailed, faxed or otherwise transmitted to the insured, or may be made available to the insured as digital image files.

Figure 14:
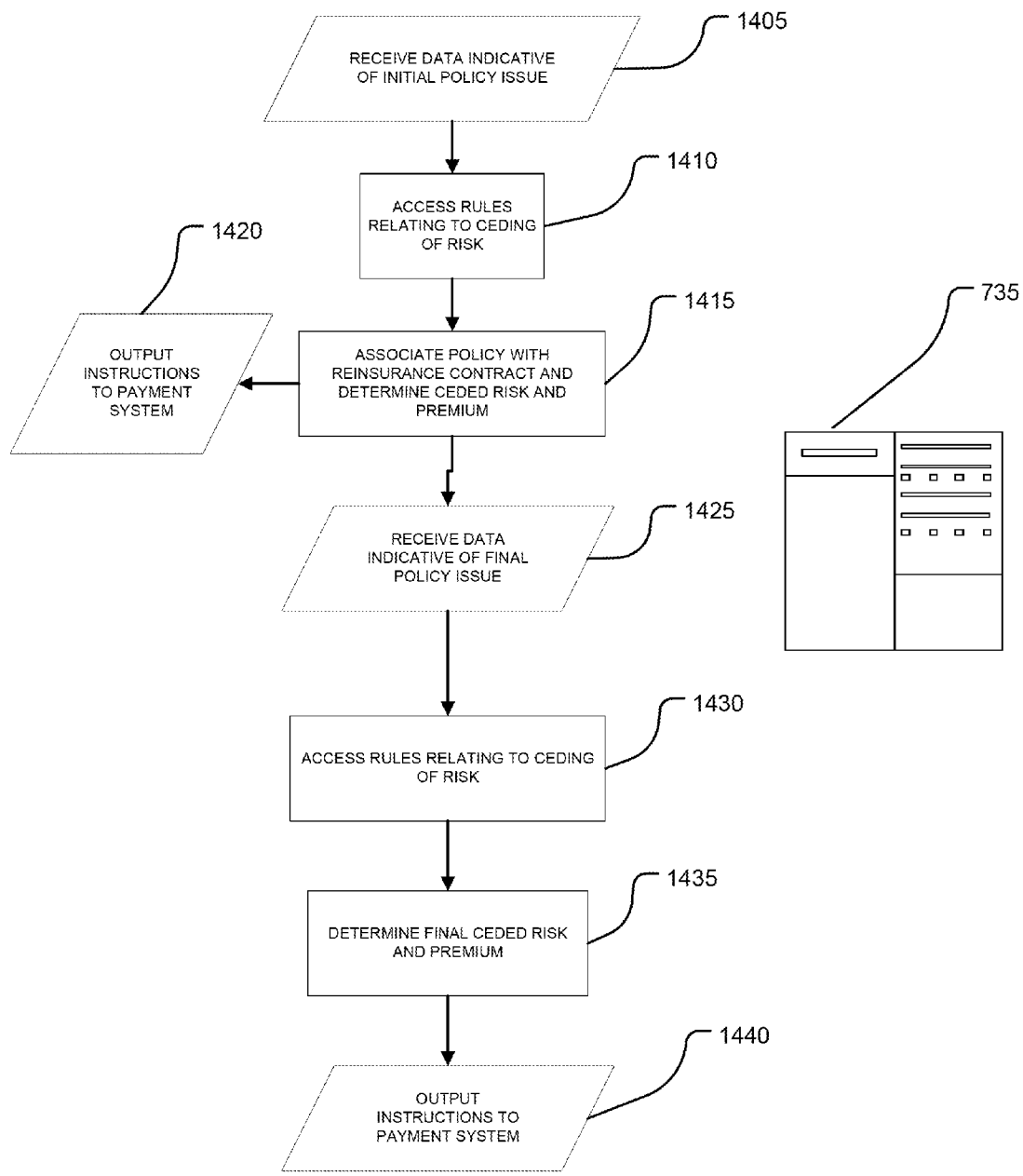
FIG. 14 is a flow diagram of an exemplary process performed by a reinsurance administration system.

Referring to FIG. 14, a process flow diagram of a process performed by reinsurance administration system 735 of FIG. 7 is illustrated. The system receives 1405 data indicative of an initial policy issued prior to comprehensive underwriting. The data may be provided by the policy administration system 710. The received data may include sufficient data to associate a policy with a reinsurance contract, determine an amount of risk ceded and calculate a reinsurance premium associated with the ceded risk. Data may include insured data, beneficiary data, face value or death benefit amount, type of policy and premium amount. The system may access 1410 from a memory device rules relating to ceding of risk, such as rules associating a policy with a reinsurance contract, percentages and/or thresholds of risk ceded, and premiums for ceding the risk. The system may associate 1415 the policy with a reinsurance contract and determine the ceded risk and the reinsurance premium. The system may provide 1420 an output signal having data indicative of instructions to a payment system to provide a payment to a reinsurer for the reinsurance premium associated with the policy. The system may also provide output signals indicative of ceded risk and premiums to reinsurer computer systems, for example.

The system may receive 1425 data indicative of a final policy. The data indicative of a final policy may be received from policy administration system 710 and include changed data relating to policy face value, risk data, death benefits, premiums, and other data. The system accesses 1430 from a memory storage rules relating to ceding of risk. The system determines 1435 final ceded risk and reinsurance premiums for the ceded risk. The system may determine any difference between the reinsurance premium calculated responsive to receipt of data indicative of the initial policy issue and the reinsurance premium calculated responsive to receipt of data indicative of final policy issue. The system may provide 1440 an output signal to the payment system if an additional amount is to be paid to the reinsurer. The system may provide an output signal having data indicative of amounts of risk ceded, the associated policy, reinsurance premiums, and other data, to other computer system, such as to reinsurer system and to accounting systems.

Referring to FIG. 15, a process flow of a process that may be performed by a processor of policy issuance server 630 of FIG. 6. The processor may receive 1505, from handheld computing device 610 of FIG. 6, a request for an application for life insurance for issue prior to comprehensive underwriting. The processor may access 1510 stored application data from a memory storage device in communication with the processor. The processor may provide 1515 an output signal to the handheld device, including data to provide a display on the handheld device to prompt the user for data required for an application for a life insurance policy for issue prior to comprehensive underwriting. The display may be provided in a single screen or in multiple screens. In an embodiment, the display 1120 of FIG. 11 may be included. In an embodiment, the display may include a prompt for confirmation that the application is being submitted by a licensed insurance broker. The prompt may include prompts for the name of an individual broker, the name of a firm, and identifying data, such as address data, state of license and license number. The prompt may include a prompt to provide an initial premium payment, such as by a credit card account or an electronic funds transaction from a bank account.

The processor may receive 1520 life insurance application data from the handheld device. The data may include basic application data, such as proposed insured data, including name, address of residence, age and gender, type of policy, amount of face value, beneficiary identification, as well as affirmative or negative responses to a limited set of questions regarding the health of the proposed insured.

The processor may determine whether the application is complete, whether the proper premium has been received, and whether the proposed insured is eligible 1525, using criteria discussed above. This determination may be made in real time. If the insured is not eligible 1530, an output signal may be provided to the handheld device to display that the application has been declined 1535. The output signal and display may be provided in real time. For example, the response may be provided within less than a minute or within a few minutes, depending on timing to obtain data and return data to the handheld device. If the proposed insured is eligible, an output signal may be provided 1540 to the handheld device to display a link to policy documents in real time. The policy documents may be generated by a suitable computer system and made available on a web server via the link.

The processor may subsequently receive 1545 the results of comprehensive underwriting. Any modifications to the policy may be determined 1550, and an output signal 1555 provided to the handheld device to display modified policy documents. A prompt may be provided for the device to display a screen prompting the user to confirm that the user will agree to any policy modifications, such as a modification to the premium as a result of risk data.

The present invention is operable with computer storage products or tangible and non-transitory computer readable media that contain program code for causing a processor to perform the various computer-implemented operations. The tangible or non-transitory computer-readable medium is any physical data storage device that can store data which can thereafter be read by a computer system such as a microprocessor. The media and program code may be those specially designed and constructed for the purposes of the present invention, or they may be of the kind well known to those of ordinary skill in the computer software arts. Examples of tangible or non-transitory computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

A processor may be configured to perform certain operations by having access to program code in a non-transitory, tangible computer-readable medium, which code includes processor-executable instructions for performing those operations. A processor may also be configured to perform certain operations by virtue of being a specially configured hardware device such as an ASIC, a PLD, or having instructions carried on permanent or programmable ROM devices. A processor may provide the central processing unit (CPU) functions of a computing device on one or more integrated circuits. The term "processor" may include multi-core processors and central processing units including multiple microprocessors.

In embodiments, a processor may provide an output signal having data indicative of one or more data items. An output signal may be carried either over a suitable medium, such as wire or fiber, or wirelessly. An output signal may transmit data from one device to another directly, such as over a bus of a computer system from a processor to a memory device, or indirectly, such as over multiple networks, and with intermediate steps of storage in a buffer or memory device and retransmission. Such an output signal may be provided by the processor to a bus of a computer system together with address data at a series of clock intervals. The address data may designate a destination device on a bus, by way of example. In embodiments, an output signal may be a signal output from a hardware communications device of a computer system to a network, such as a local area network, a wide area network, or a network of interconnected networks, such as the Internet. Output signals may include, by way of example, data identifying formats, fields, and content of fields. Signals may be compatible with any appropriate format. For example, data may be formatted in accordance with a data format for insurance data, such as an ACORD compatible format. Reference to an output signal having particular data may include one or more signals bearing the information. Multiple signals bearing the information may include sequences of digital data bearing the information interleaved with sequences of digital data relating to other information. By way of example, a signal may be packetized for transmission. By way of further example, an output signal may take the form of an uncompressed digital signal or a compressed digital signal.

A system in accordance with the invention may include means corresponding to each step in each method described herein. Each means may be implemented, by way of example, by a processor executing instructions contained in program code which may be stored in a storage medium and loaded into random access memory for execution. It will be appreciated that any of the steps in the methods in accordance with the invention described herein may be so implemented.

An exemplary advantage of a system and method in accordance with an embodiment is that a prospective insured may obtain policy coverage without the need to wait until the completion of a comprehensive underwriting process. A further exemplary advantage is that comprehensive underwriting is completed and the price of coverage is set based on the results of comprehensive underwriting. A further exemplary advantage is that reasons that in the prior art motivate prospective insureds to choose not to proceed after the completion of comprehensive underwriting, such as the lack of policy issue before completion of comprehensive underwriting, are decreased.

An exemplary advantage as compared with the Harkensee '583 disclosure is that the comprehensive underwriting is carried out for all applications after the policy is issued. A further advantage is that the insurance company cannot permit the insurance contract to expire or reduce the benefits.

An exemplary advantage as compared with the Harkensee '584 disclosure is that comprehensive underwriting is carried out for all applications after the policy is issued. A further advantage is that the premium may set consistent with traditionally underwritten policies at the outset.

An exemplary advantage as compared with the Harkensee '585 disclosure is that the policy in an embodiment of a method and system of the present invention provides for coverage for both natural causes and accidental death from the outset of the policy.

While the foregoing invention has been described with reference to the above embodiments, various modifications and changes can be made without departing from the spirit of the invention. Accordingly, all such modifications and changes are considered to be within the scope of the appended claims.

What is claimed is:

1. A computer system for administering applications for insurance, comprising:
   a processor;
   a memory storage device having stored data indicative of criteria for eligibility for issue of a life insurance policy prior to comprehensive underwriting, in communication with the processor;
   the processor configured to:
   receive data indicative of an application by a proposed insured for life insurance for issue prior to comprehensive underwriting;
   determine, based on the received data, whether the proposed insured is eligible for life insurance for issue prior to comprehensive underwriting;
   responsive to a determination that the proposed insured is eligible, generate an output signal having data indicative of instructions to issue a life insurance policy on the life of the proposed insured, and an output signal having data indicative of instructions to commence comprehensive underwriting of the proposed insured, insured;
   provide to an insurance process administration computer system data relating to the issued initial policy for determining insurance data associated with the issued initial policy;
   receive data indicative of a result of the comprehensive underwriting process;
   based on the result of the comprehensive underwriting process, determine terms of a final issued policy; and
   provide to the insurance process administration computer system data relating to the final issued policy.

2. The system of claim 1, wherein the insurance process administration computer system is a reinsurance administration computer system, the insurance data associated with the issued initial policy being risk associated with the issued initial policy to be ceded to a reinsurer.

3. The system of claim 1, wherein the insurance process administration computer system is a policy owner reporting computer system configured to print policy documents.

4. The system of claim 3, wherein the policy owner reporting computer system is configured to print first selected documents responsive to receiving data indicative of the initial issued policy, and to print second selected documents responsive to receiving data indicative of the final issued policy.

5. The system of claim 4, wherein the first selected documents comprise documents relating to riders effective upon issue of the policy.

6. The system of claim 5, wherein the second selected documents comprise documents relating to riders effective after completion of comprehensive underwriting.

7. The system of claim 1, wherein the insurance process administration computer system is a commissions and accounting computer system.

8. The system of claim 1, wherein the commissions and accounting computer system is configured to determine a first commission amount responsive to receiving data indicative of the initial issued policy, and to determine a second commission amount responsive to receiving data indicative of the final issued policy.

9. A computer-implemented method for administration of insurance, comprising:
   receiving by a processor, and storing by the processor in a memory device in communication with the processor, data indicative of an application and an initial premium payment from a proposed insured for life insurance for issue prior to comprehensive underwriting;
   based on the received data, determining by the processor whether the proposed insured is eligible for life insurance issued prior to comprehensive underwriting;
   responsive to a determination that the proposed insured is eligible, generating by the processor an output signal having data indicative of a decision to respond to the application by issuing an initial policy and commencing a comprehensive underwriting process, and providing to an insurance process administration computer system data relating to the issued initial policy for determining insurance data associated with the issued initial policy;

receiving by the processor data indicative of a result of the comprehensive underwriting process;

based on the result of the comprehensive underwriting process, determining by the processor terms of a final issued policy; and providing to the insurance process administration computer system data relating to the final issued policy.

10. The method of claim 9, further comprising determining by the insurance process administration computer system, responsive to receiving the data relating to the initial issued policy an amount of risk associated with the issued initial policy to be ceded to a reinsurer.

11. The method of claim 10, further comprising determining by the insurance process administration computer system, responsive to receiving the data relating to the final issued policy, an amount of risk associated with the final issued policy to be ceded to a reinsurer.

12. The method of claim 9, further comprising determining by the insurance process administration computer system, responsive to receiving the data relating to the initial issued policy, first selected policy documents for printing and delivery to the insured.

13. The method of claim 12, further comprising determining by the insurance process administration computer system, responsive to receiving the data relating to the final policy, second selected policy documents for printing and delivery to the insured.

14. The method of claim 13, wherein the first selected documents comprise documents relating to riders effective upon issue of the policy, and the second selected documents comprise documents relating to riders effective after completion of comprehensive underwriting.

15. The method of claim 9, further comprising determining by the insurance process administration computer system, responsive to receiving the data relating to the initial issued policy, a first commission amount, and determining by the insurance process administration computer system, a second commission amount responsive to receiving data indicative of the final issued policy.

16. A computer system for issue and administration of life insurance policies, comprising:

a processing module, comprising a processor, for operable to:
 receive data indicative of an application and an initial premium payment from a proposed insured for life insurance for issue prior to comprehensive underwriting; and
 determine, based on the received data, whether the proposed insured is eligible for issue of life insurance issued prior to underwriting;

an administration module, comprising a processor, operable to:
 responsive to a determination by the processing module that the proposed insured is eligible, administer a mandatory comprehensive underwriting process; and
 determine risk data based on a result of the mandatory comprehensive underwriting process; and an issuance module, comprising a processor, operable to issue a life insurance policy to the proposed insured prior to the mandatory comprehensive underwriting process and responsive to the determination by the processing module that the proposed insured is eligible.

17. The computer system of claim 16, further comprising a communications module operable to provide to an insurance process administration computer system data relating to the issued policy responsive to issue and responsive to the determination of the risk data.

18. The computer system of claim 17, wherein the insurance process administration computer system is a computer system operable to generate policy documents, and the communications module is further operable to provide data relating to the issued policy responsive to issue and responsive to the determination of the risk data to a reinsurance administration computer system.

19. The computer system of claim 18, wherein the communications module is further operable to provide data relating to the issued policy responsive to issue and responsive to the determination of the risk data to a computer system operable to determine commissions.

20. A computer-implemented method for issue and administration of life insurance policies, comprising:

receiving by a processing module, comprising a processor, data indicative of an application and an initial premium payment from a proposed insured for life insurance for issue prior to comprehensive underwriting;

determining by the processing module, based on the received data, whether the proposed insured is eligible for issue of life insurance issued prior to underwriting;

administering by an administration module, comprising a processor, responsive to a determination by the processing module that the proposed insured is eligible, administering a comprehensive underwriting process;

determining by the administration module risk data based on a result of the comprehensive underwriting process; and issuing by an issuance module, comprising a processor, a life insurance policy to the proposed insured prior to the comprehensive underwriting process and responsive to the determination by the processing module that the proposed insured is eligible.

21. The computer-implemented method of claim 20, wherein the determined risk data comprises a rating classification.

22. The computer-implemented method of claim 20, wherein the data indicative of an application comprises data indicative of a first death benefit amount requested for a period prior to comprehensive underwriting and a second death benefit amount requested for a period after completion of comprehensive underwriting.

23. The system of claim 1, wherein the comprehensive underwriting process is mandatory.

24. The method of claim 9, wherein the comprehensive underwriting process is mandatory.

25. The computer-implemented method of claim 20, wherein the comprehensive underwriting process is mandatory.

* * * * *